(12) United States Patent
Masters et al.

(10) Patent No.: US 6,741,925 B2
(45) Date of Patent: *May 25, 2004

(54) USER INTERFACE FOR ELECTRONIC CONTROLLER AND TIMING SENSOR

(75) Inventors: Stephen C. Masters, El Paso, TX (US); Douglas B. Waits, El Paso, TX (US)

(73) Assignee: Autotronic Controls Corporation, El Paso, TX (US)

( * ) Notice: Subject to any disclaimer, the term of this patent is extended or adjusted under 35 U.S.C. 154(b) by 200 days.

This patent is subject to a terminal disclaimer.

(21) Appl. No.: 09/881,615

(22) Filed: Jun. 14, 2001

(65) Prior Publication Data

US 2001/0056323 A1 Dec. 27, 2001

Related U.S. Application Data

(63) Continuation-in-part of application No. 09/432,454, filed on Nov. 2, 1999, now Pat. No. 6,304,814.

(51) Int. Cl.[7] .................... F02D 28/00; F02D 43/04
(52) U.S. Cl. .................... 701/115; 324/378; 701/54; 701/110
(58) Field of Search ................... 701/115, 110, 701/114, 53, 54; 324/378; 700/17

(56) References Cited

U.S. PATENT DOCUMENTS

| 4,005,388 | A | | 1/1977 | Morley et al. ............... 341/23 |
|---|---|---|---|---|
| 4,291,375 | A | | 9/1981 | Wolf ........................... 702/62 |
| 5,091,858 | A | | 2/1992 | Paielli ....................... 701/115 |
| 5,179,928 | A | * | 1/1993 | Cour et al. ................ 123/606 |
| 5,182,512 | A | * | 1/1993 | Braun et al. ............... 324/378 |
| 5,187,655 | A | | 2/1993 | Post et al. .................... 700/17 |
| 5,672,972 | A | * | 9/1997 | McCoy et al. ............. 324/393 |
| 5,803,043 | A | | 9/1998 | Bayron et al. ............. 123/335 |
| 5,862,507 | A | * | 1/1999 | Wu et al. ................... 701/111 |
| 6,304,814 | B1 | * | 10/2001 | Masters et al. ............ 701/110 |
| 2003/0052687 | A1 | * | 3/2003 | McQueeney et al. ..... 324/402 |

* cited by examiner

Primary Examiner—Hieu T. Vo
(74) Attorney, Agent, or Firm—Fitch, Even, Tabin & Flannery

(57) ABSTRACT

A programmable electronic ignition system is provided including a hand-held programmer, or in the alternative a computer, for controlling engine control parameters including revolutions per minutes limiters, ignition timing retards, gear shift controls and revolutions per minute switching. The hand-held programmer or computer provides a menu driven interface which directs the user through the engine control parameters using easy to recognize terms. The programmable electronic ignition system can employ a cylinder location sensor to identify a predetermined cylinder for controlling individual cylinder ignition timing retards.

8 Claims, 26 Drawing Sheets

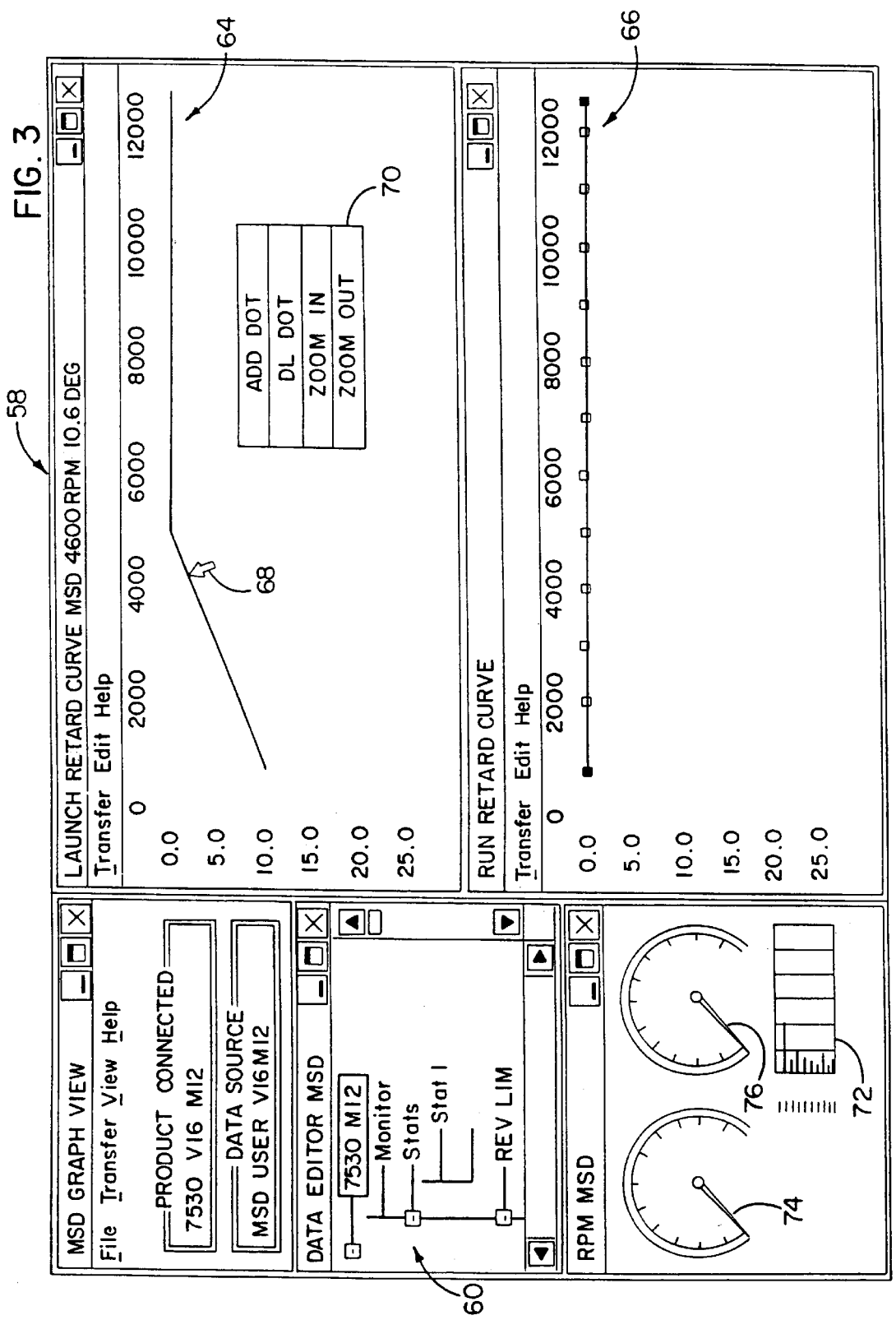

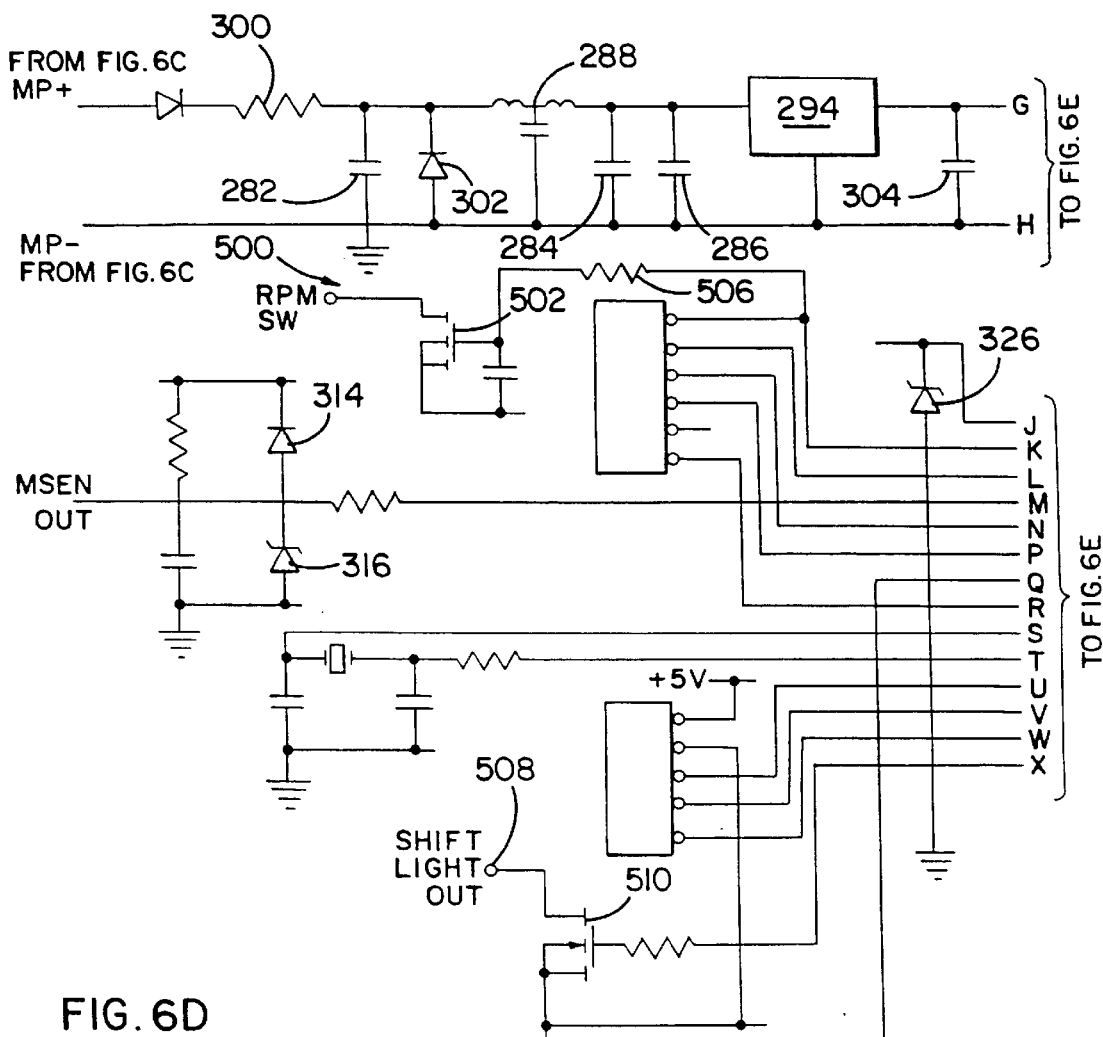
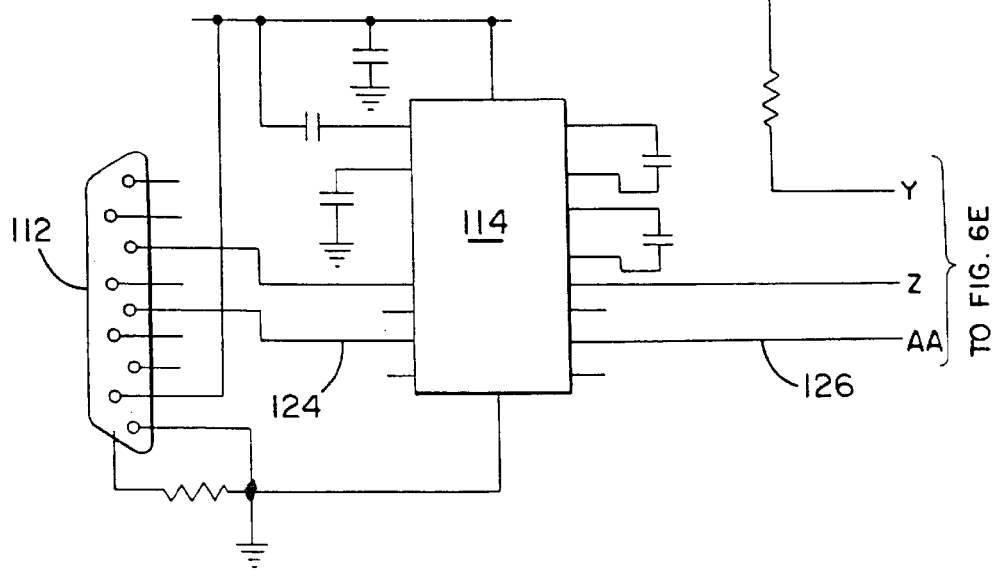
FIG. 6D

USER INTERFACE FOR ELECTRONIC CONTROLLER AND TIMING SENSOR

CROSS REFERENCE TO RELATED APPLICATION

This application is a continuation-in-part of prior application Ser. No. 09/432,454, filed Nov. 2, 1999, now U.S. Pat. No. 6,304,814 B1. issued on Oct. 16, 2001, which is hereby incorporated by reference in its entirety.

BACKGROUND OF THE INVENTION

1. Field of the Invention

The invention relates to a method and system for electronically controlling various operational parameters such as revolutions per minute (RPM), ignition spark timing, cylinder timing and gear shifting of an internal combustion engine. Specifically, the present invention allows such control via an interface that has an easy to read, word based menu system and method for easily changing related engine operational parameters.

2. Description of the Related Art

Conventional, mechanical methods of controlling engine parameters have been employed to govern the maximum revolutions per minute (RPM) the crankshaft of an engine rotates, set ignition spark timing and to control gear shifting.

In the past, revolutions per minute that the crankshaft rotates were limited by controlling the amount of fuel delivered for consumption. Modem, spark internal combustion engines typically utilize the ignition system to control RPM of the engine. Once the engine has reached the maximum RPM allowed, the ignition system will cut the electrical impulse to the spark plug, thereby preventing the spark plug from firing in the cylinder and consumption of fuel. Various methods have been employed to sequentially or randomly interrupt the firing order of the spark plugs. Adjustable RPM limiters typically utilize dial or resistor-type chips on the ignition box itself to set the maximum RPM allowed during operation. More complex RPM limiters allow for more than one RPM limit to be set for controlling RPM during various conditions or stages of operation. Once the maximum RPM of the first set dial or chip is reached, the engine is allowed to reach the next maximum RPM set by the next dial or chip and so on. One problem associate with these types of RPM limiters is that the adjustable dials are typically small and difficult to change in order to prevent the dial from rotating due to engine and chassis vibration. Furthermore, systems that utilize resistor chips are limited by what chips the user has and both systems are limited by the predetermined increments of the dials or the chips.

To increase performance and accuracy of timing in high revolutions per minute engines, electronic ignition systems were developed. As RPM increase, the timing cycles for delivering a spark to the cylinder becomes very compressed and further rotating parts, crank and camshaft, may bend under stress, thereby adding inaccuracies in conventional, mechanical timing systems. Electronic ignition systems overcome these mechanical inaccuracies by typically triggering the spark timing off of the flywheel or balancer on the crankshaft or the camshaft, thereby eliminating the need to mechanically adjust the timing at the camshaft and distributer.

For peak efficiency, the fuel must be ignited in the cylinder on the up stroke of the piston as the fuel mixture is under pressure to give the flame created by the spark time to travel across the cylinder and ignite the fuel mixture. For example, a spark timed to arrive at X degrees advance, before top dead center (TDC) of the piston, may actually spark many degrees before or after the set timing. Improper timing or inaccurate sparking may cause detonation in which the fuel ignites while the piston is at the early phase of the upward travel, pre-ignition, or later in the downward stroke which may damage the valve train assembly, piston, connect rod or in the extreme, the crankshaft.

Typically electronic ignition systems ramp up to a set degree of ignition timing as RPM increase. For example, with ignition timing set at 30 degrees advance, the actual ignition timing may begin from start up (0 RPM) at 10 degrees advance and linearly increase until the timing reaches 30 degrees advance at thousands of RPM later. One problem associated with electronic ignition timing systems, is the inability to set degrees ignition timing as a function of RPM or the ignition system may only allow changing slope of the linear ramp up timing, thereby preventing the engine from operating at peak efficiency or maximum power. Furthermore, these systems do not allow the changing of the ignition timing as a function of an event such as a gear shift.

Sudden changes in cylinder pressure due to the boost of a turbo charger, the injection of nitrous oxide into the fuel mixture, gear shifts or the combination thereof, present another problem for ignition timing. As cylinder pressure changes, the optimum ignition timing point may also change. Electronic ignitions systems have been developed to monitor cylinder or inlet manifold pressure and compensate for these changes, but are limited by the sampling rates of the electronics used and typically do not let the user input timing adjustments. Furthermore, in high performance applications, the timing adjustments cannot be made quickly to compensate for the rapid changing conditions.

To achieve peak engine performance in a racing application, the racer or crew chief may alter engine components and settings to find the optimum combination. Ignition timing is one such setting that must be optimized for each engine combination. The racer often finds the optimum ignition timing setting by adjusting the timing and making a run with the racecar to determine its effect. This process cannot only be time consuming, but also tedious due the physical requirements of manually changing the ignition timing.

Furthermore, varying weather conditions will also affect the performance of these types of engines. Any change in temperature, barometric pressure, humidity or combination thereof will affect the performance characteristics of the engine. Ignition timing is one parameter the racer may change to compensate for these changes in weather conditions.

Also, the racer may alter ignition timing to control the performance of the racecar. For example, in some drag racing applications were the race is run on an ET (elapsed time) index, the racer may desire to slow the ET of the racecar using ignition timing. By retarding the ignition timing, the racer can, in effect, de-tune the engine and elongate the elapsed time of the run. Thus, it is desirable to have an ignition timing system capable of allowing the user to pre-select timing changes as a function of RPM or events.

Another physical limitation of mechanical ignition systems is the inability to control individual cylinder timing. In a conventional mechanical ignition system, the timing is set in relation to TDC of one cylinder. Typically, the first cylinder that fires is used to physically set when the rotor of the distributor makes contact with the terminal which supplies the current to the spark plug when that piston is at TDC, or at a particular degree of timing before TDC, i.e., rotor phasing. Once the rotor is phased, all cylinders will then fire in relation to this pre-determined phasing. The timing can be further adjusted by rotating the entire distributor and shaft and with a timing light, monitoring the timing at the balancer.

In high RPM engines, it may be advantageous to have one or more cylinders firing before or after the pre-selected timing to optimize the efficiency for the conditions of each individual cylinder. For example, with the timing set at 30 degrees advance (before TDC), one cylinder which creates a higher pressure than the rest may burn more efficiently if fired at 25 degrees advance. Thus, for peak efficiency and maximum power applications, it is advantageous to be able to control individual cylinder timing. Although this may be achieved by some real-time using computer systems, these systems may be too slow for high RPM engines and may not be allowed by race sanctioning bodies and further, they do not allow the user to select and specify the individual cylinder timing.

In high performance engines, as well as all engines, there exists an optimum RPM to shift from one gear to the next. It is well known in the automotive industry to use a "shift light" to signal the driver to manually shift gears once the correct RPM has been reached for that particular gear shift. Such shift lights are typically controlled by an electronic system which monitors the tachometer and sends a signal to illuminate shift light once a particular RPM determined by a computer or a dial-type switch has been reached. In an automatic transmission, this signal can also be used to activate an automatic shifter. Typically, these gear shift systems are separate and independent of the electronic ignition timing systems and, thus, two electronic "boxes" must be placed on the car.

One attempt to combine both an ignition timing and gear shift controller is the QUICKSHOT™ Programmer and ProStrip Annihilator ignition system developed by Holley Performance Products. Due to the small physical size, the programmer uses a two digit or letter code to identify the parameter and then removes the code and displays the first two digits of value for that particular parameter. Thus, the user must either memorize or use a reference aids to identify the code for the parameter. However, this may become very inconvenient for the racer in the field where the level of surrounding activity can be extremely disruptive due to the limited time between runs, to refer to a reference manual or code sheets while attempting to make adjustments. Moreover, if the codes are confused and the wrong engine control parameter is inadvertently changed, misfiring, or incorrect shifting may result which can cause significant engine damage. Furthermore, due to the limited display on the programmer, approximately 1.25 inches by 1 inch, only one individual parameter code can be viewed and selected at a time. Also, this system does not provide an efficient, user-friendly method for controlling individual cylinder ignition timing.

Accordingly, an interface that allows a wide variety of engine operational parameters to be adjusted via an easy to recognize engine parameter terms on its display. In this regard, a system is needed which allows engine parameter changes to be made quickly without the need of reference materials and provide safeguards to prevent for inadvertent changes in one engine control parameter which may dampen performance or result in engine damage. Furthermore, it would be desirable to provide a programmable engine control system capable of controlling multiple functions such as gear shifting, individual cylinder timing and RPM controls in one box thereby reducing the number of electronic units needed in the car.

SUMMARY OF THE INVENTION

The present invention provides a unique approach to controlling engine control parameters by providing a menu driven system which limits which engine parameters the user may change at one time. The present system and method utilizes a menu driven hand-held programmer, or in the alternative a computer, which directs the user through various engine control parameters using easy to recognize terms.

In racing application such as drag racing, racers are won and lost by ten thousandths of a second. Therefore, optimum performance must be achieved during each run to increase efficiency and gain consistency while preventing damage to the engine. One method of increasing consistency and protecting the engine is to limit the RPMs ("revlimit") the engine turn during specific events of the drag race. For example, the racer may desire to control the maximum RPM the engine can reach during the burn-out portion of the race. A burn-out is a procedure which involves either rolling through water and spinning the tires at high RPM once on dry pavement or spinning the tires in the water while using the front brakes to hold the car. This spinning warms the surface temperature of the tire which increases the stickiness of the rubber for a greater grip at the starting line. However, during the burn-out, the engine RPM may rise significantly because the tires are spinning instead of moving the racecar under a load. Therefore, in high RPM engines, it is advantageous to limit the RPMs the engine may turn to prevent catastrophic failure of the engine.

Another portion of a drag race the racer may desire to control RPMs is during the launch stage. After the driver has completed the burn-out, the driver will roll the front tires into a set of light beams, thereby "staging" the car. Once staged, the racer will either activate a transbrake which holds the transmission in first and reverse or engage the clutch of a manual transmission and hold the car using a hand brake. The driver will then "mat" the accelerator pedal to increase the engine RPMs. This allows the engine to be at high RPMs when the car is launched. Again, without controlling the maximum RPMs the engine may reach, the engine may reach extremely high RPMs which may result in engine component failure. Thus, it is desirable to have a revlimiter for the launch portion of the race. Similarly, the driver may desire to control the maximum RPMs the engine may reach over the entire run of the race to prevent "red-lining" and engine damage.

The racer will typically make these types of revlimit adjustments, as well as gear shift settings and others, before and after a run of the car at the track to achieve the desired performance. However, the racer must be able to quickly input the adjustments due to the short time available between runs. Accordingly, it can be extremely confusing and inconvenient for the racer to have to refer to reference manuals or code-key sheets to input adjustments to engine control parameters such as required by the previously described system. Furthermore, a light-weight programmer which may be easily held and quickly viewed is required so that the racer can make adjustments on both the car and the programmer without have to carry a computer to the car or walk back and forth between the computer and the racecar.

The present invention provides easy-to-read indicia which are word-based allowing the racer to make the desired adjustments by scrolling through menus and switch screens depending on the words read on the screen. This eliminates the needs for referring back and forth between the screen and a code book. The interface displays the indicia in English or other foreign languages may be used tailored to the preferred language of the user. Furthermore, many racers collect data from the run using computer-based electronics, down-load the data after the run and view the data on a computer to determine what adjustments are needed. In one form, the invention provides the racer the option to view engine control parameters such as individual cylinder timing and an ignition timing run curve that represents timing changes over the entire run on a computer display in graphical representations. This allows the racer to quickly view the information without scrolling through excess data and allows the racer to make quick decisions and changes based on the data displayed. Also, the user may program a single value for controlling the revolutions per minute at the launch of the race by using another interface, a small module with rotary dials which can be mounted in the cockpit of the racecar.

The present invention allows for maximum RPM controls to be set by selecting one menu screen which displays selection choices of maximum RPM controls as used in drag racing applications. For example, the user may select and input the maximum RPM setting during the burn-out, thereby eliminating the need for tedious resistor-chips or dials. Instead, the present invention allows inputting the actual RPM number in one hundred degree increments using a keyboard on the small, approximately 3.5 inches by 3 inches, hand-held programmer and easily viewed on the 1 inch by 2 inches screen. Furthermore, these RPM controls may only be changed while in the RPM menu thereby preventing inadvertent changes.

Ignition timing can also be controlled at various stages of the drag race after the initial timing has been set, e.g., the user can retard the ignition timing during the launch of the race car from the starting line and select a ramp of the ignition timing curve as the RPM increase. Furthermore, the menu system also allows for retarding the ignition timing as a function of RPM by numerically inputting the RPM and degree of retard timing necessary for that RPM. This is especially helpful for racecars using a turbo charger or those which utilize nitrous oxide. In the alternative, the user may select a launch or run curve which allows the user to specify the ramp-up of the ignition timing during the launch of the racecar from the starting line or during the entire run. Again, the user simply inputs the RPM value and the degree of timing for that value and continues to input those values over the duration of the run or the launch.

The present invention can also provide independent timing retard of individual cylinders. While in the cylinder degree menu, the user may input the degrees of timing retard for each individual cylinder by selecting the cylinder and numerically inputting the degrees of timing retard from 0 to 5 degrees in 0.1 degree increments. This allows the user to optimize the performance of each individual cylinders. For example, if a cylinder, or more if needed, is creating a higher internal pressure than the rest, that cylinder will burn more efficiently if fired earlier. Thus, the present invention allows the user to set ignition timing for all cylinders and, at the same time, change the timing of one cylinder.

The gear shifting parameters which can be used to illuminate a gear shift light or to automatically control a shifter may also be controlled. The user may select up to five gear shift parameters by numerically inputting the RPM per shift light (or shift) indicator. Further, ignition timing can also be retarded in response to a change in gear. Thus, the need for a separate gear shift controller is eliminated by combining a revolution limiter, ignition timing and gear shift controller in one system.

The programmable engine controller utilizes a non-volatile memory to store the inputted parameters. Thus, once the hand-held programmer or a computer connection of a computer is removed, the engine control parameters are stored in the non-volatile memory in the electronic controller. Further, these values may only be changed when programmer or computer is interfaced with the controller.

The details of the invention, together with further objects and advantages of the invention, are set forth in the detailed description which follows. The precise scope of the invention is defined by the claims annexed to and forming a part of this specification.

BRIEF DESCRIPTION OF THE DRAWINGS

A better understanding of the present invention is obtained when the following detailed description is considered in conjunction with the following drawings in which:

FIG. 3 is display of a screen of a personal computer that can be used in conjunction with the electronic controller;

FIGS. 6A–6G are schematic diagrams of the electronic controller;

DETAILED DESCRIPTION OF THE PREFERRED EMBODIMENTS

Figure 1:
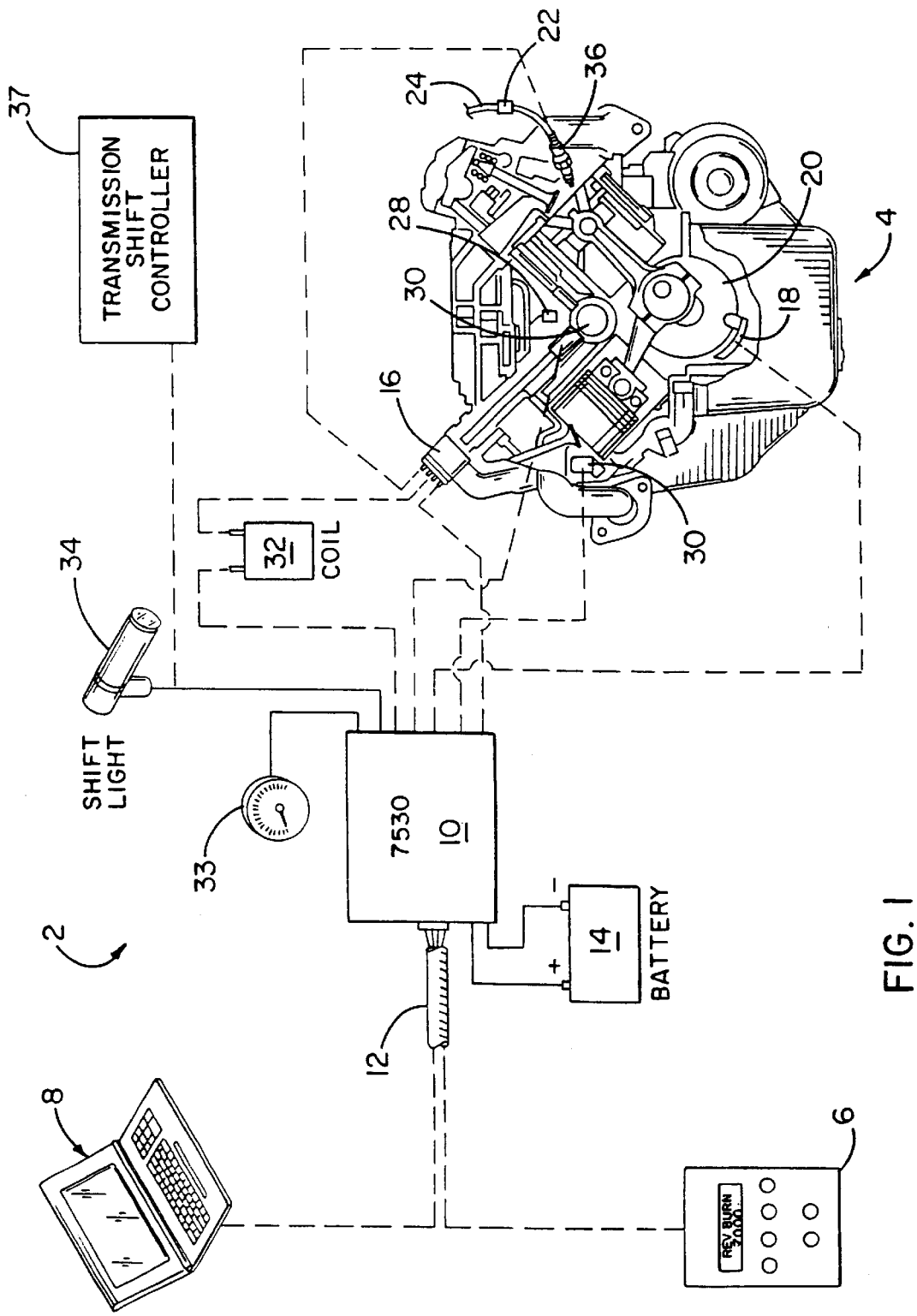
FIG. 1 is an diagrammatic view of an internal combustion engine, programmable electronic controller and related components according to the invention.

FIG. 1 illustrates a preferred form of a programmable electronic control system 2 as used with an internal combustion engine 4. A programmable electronic ignition controller 10 is provided which allows a racer to use an interface in the form of a hand-held programmer 6 or alternatively, a personal computer 8, such as a lap-top computer to readily make adjustments to the engine operation al parameters via the electronic controller 10. Both the hand-held programmer 6 and the computer 8 communicate with an electronic controller 10 via a data connection 12. A conventional lead-acid, twelve volt battery 14 can supply the electrical current to the electronic controller 10.

Figure 2A:
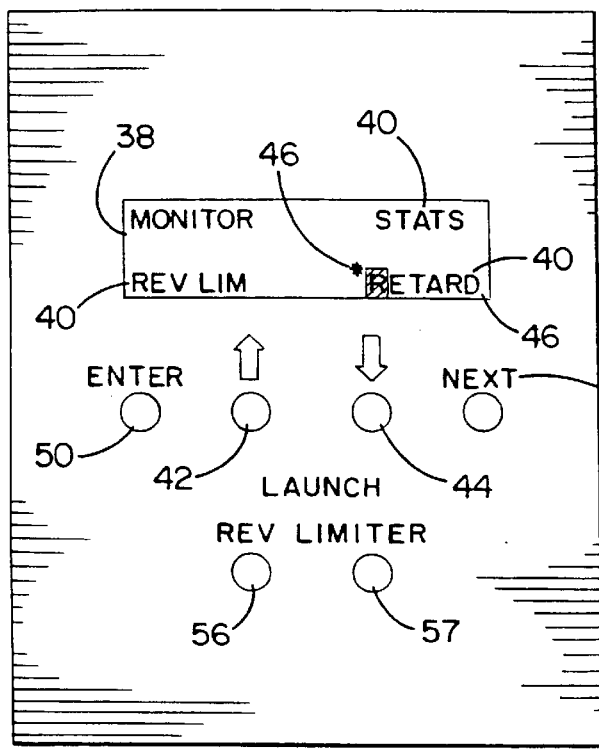
FIGS. 2A and 2B are plan views of a hand-held programmer.

The programmable electronic control system 2 functions as a digital, multispark, capacitive discharge ignition system with user programmable features, such as an RPM switch, gear shift controller and revlimiter controller. The user, typically a racer, may program the ignition system using the hand-held programmer 6 or a computer 8 to control various engine control parameters during various stages or conditions of a drag race. The hand-held programmer 6 uses a menu based system to displays indicia of engine control parameters on an LCD screen 38 as depicted in FIG. 2A. The indicia are words or abbreviated words, e.g., racing jargon, to allow the indicia to fit on the limited size screen. By using a word based system, the racer does not have to inconveniently refer to separate materials such as code or reference books or the like to interpret the indicia displayed on the screen 38. One engine control parameter that may be programmed is the maximum revolutions the engine can turn during various stage of the drag race. Specifically, these include the burn-out revlimit, launch revlimit and maximum revlimit to prevent overrev of the engine.

The programmable electronic controller 10 also allows the racer to program multiple ignition timing retards from the start of the race to over the entire run. The retard start engine control parameter, or the indicia "RetStart" as displayed on the hand-held programmer 6, retards the ignition timing at the start of the engine, 0 RPM, through 800 RPM to the value programmed by the racer on the hand-held programmer 6 or computer 8. Further, the racer may delay the step retard by using the step retard deactivation delay parameter, or the "StepOffDelay" indicia, which provides for delaying the retard step from 0 to 2.50 seconds. Similarly, the launch retard, or "RetLaunch" indicia, allows the racer to program an ignition timing retard value to be activated at the launch of the drag race and the electronic controller 10 gradually removes, or ramps up, the programmed ignition timing retard over the number of seconds the racer has programmed.

The multi-stage retard feature of the programmable electronic controller 10 provides the racer the capability of programming three step retards at three user programmed RPM values. The hand-held programmer 6 indicia of "Retard 1," "Retard 2," and "Retard 3" prompts the racer to enter the RPM value and corresponding ignition timing retard value in degrees of crankshaft rotation. Furthermore, the racer may also retard the ignition timing over the entire run of the race (from start, 0 RPM, to maximum, 12,500 RPM) or just over the launch. The corresponding indicia as displayed by the hand-held programmer 6 or computer 8 are "RunCurve" and "LaunchCurve".

Another engine control parameter of the programmable electronic controller 10 is the gear shift parameter or "ShiftLight" indicia as displayed by the hand-held programmer 6 or computer 8. The gear shift light allows the racer to program at what RPM a gear shift light 34 or alternatively, automatic shift controller 36 shifts. Furthermore, the racer may also program ignition timing retards as a function of these gear shifts using the gear retards or "RetGear" indicia as seen on the hand-held programmer 6 or computer 8. These activate when the corresponding gear has shifted and retard the timing to the racer programmed value.

Another engine control parameter the electronic controller 10 commands is individual cylinder timing. The racer may program a retard for one or more cylinders of different degrees by first entering the number of cylinders the engine has by selecting the "CylCnt" indicia, and then the corresponding retard amount for each cylinder as identified by the cylinder firing order as "Spark1," "Spark2," "Spark3," as so forth.

Turning to a representative programmable electronic control system shown in FIG. 1, the electronic controller 10 can receive an input signal from a distributor 16 or alternatively a crank trigger 18 may supply the input signal to the electronic controller 10 when a distributor is present or when a distributor is not used as in the case of a distributorless ignition system. A magnetic crank trigger 18 senses the position of the balancer or dampner 20 mounted on the crank of the engine 4. The electronic controller 10 also can receive an input signal from either a spark plug firing sensor 22 mounted on spark plug wire 24 connected to the spark plug 26, or in an alternative form, a cam position sensor 28 which detects position of the camshaft 30.

The electronic controller 10 provides a signal to an ignition coil 32 which in turn, provides the high voltage, high current signal to the distributor 16 or in the case of a distributor-less ignition, to an electronic control unit (ECU) (not shown). The distributor 16 or ECU distributes the high voltage, high current signal to the spark plug 26 located in the cylinder of the engine 4. A tachometer 33 may be connected to the electronic controller 10 for displaying real-time engine revolutions per minute (RPM). The electronic controller 10 may also provide a signal to a gear shift light 34 or alternatively, an automatic transmission shift controller 36. Furthermore, the electronic controller 10 may also act as an RPM on-off switch which is activated when the electronic controller 10 senses the engine has reached a predetermined RPM value.

Figure 2B:
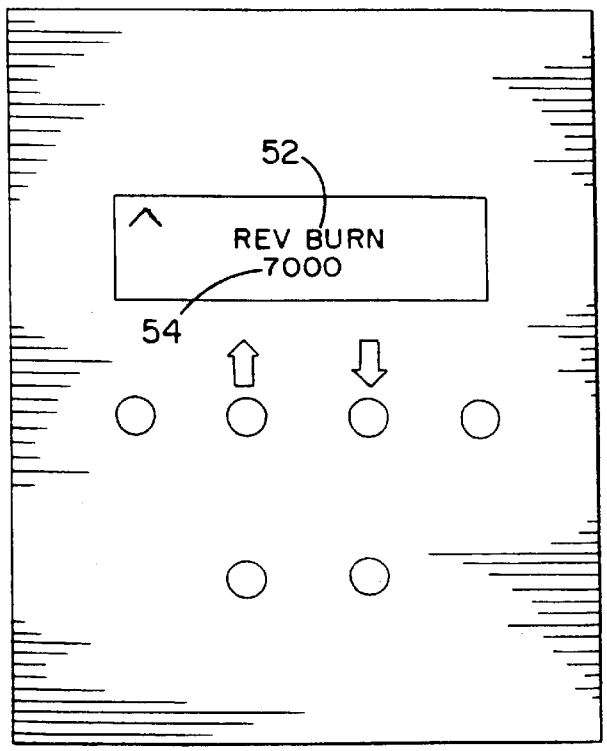

FIG. 2 depicts the hand-held programmer 6 as used in one form of the programmable electronic control system 2. So that the programmer 6 can be hand-held, it has relatively small predetermined dimensions such as on the order of approximately 3.7"×4.7"×1.3". A liquid crystal display (LCD) 38 is used to display engine control groups 40, selection choices, and the stored or default engine control values. In the illustrated form, the LCD screen 38 has dimensions of 2.25"×0.55" for displaying two lines and is broken down into four fields; however, other arrangements for producing output of readable form on the LCD screen can also be employed. The values of the engine controls of the electronic controller 10 are accessed through a menu structure and do not have to be separately accessed or looked up in reference materials apart from the output displayed on the screen 38. The hand-held programmer 6 first displays 4 engine control groups 40 on the display screen 38 using indicia easily recognized by the drag racer. The remainder of the engine control groups are displayed by scrolling up and down using UP key 42 and the DOWN key 44 on the face of the hand-held programmer 6. The UP and DOWN keys, 42 and 44 respectfully, can move the selection cursor 46 to the top left hand corner or at the bottom right hand corner of the display screen 38 to indicate that the hand-held programmer will display the previous or the following engine control groups 40 as selected by the UP and DOWN keys, 42 and 46.

The NEXT key 48 is used to move from one field, engine control group 40, to the next on the LCD screen 38. The first letter of the field or displaying the engine control group 40 will blink to indicate it has been selected. Once the field is activated, as indicated by the blinking of the first character, it may be selected by pressing the ENTER key 50. The individual engine controls 52 of the engine control group 40 are displayed on the LCD screen 38. To view or edit the values of an engine control 52, press the NEXT key 48 until the first character of the desired engine control 52 blinks. Pressing the ENTER key 50 will display the last stored or default value for the selected engine control 52. The displayed engine control value 54 may be increased or decreased by using the UP key 42 and DOWN key 46 respectively. Once the desired value 54 is displayed, the engine control value 54 is saved by pressing the NEXT key 48. After the NEXT key 48 is pressed, the hand-held programmer 6 will display three fields: save, cancel, and default item. Any of these fields may be selected by pressing the NEXT key 48 until the first character of the desired feature blinks. When the "S" of Save blinking pressing the ENTER key 50, will save the engine control value 54 in memory of electronic controller 10. The engine control value 54 may be ignored (not saved) by selecting CANCEL using the NEXT key 48. The default factory values can also be restored by pressing the NEXT key 48 until the "D" of the Default item blinks and pressing the ENTER key 50. The hand-held programmer 6 also contains two launch revlimiter keys 56 and 57 on the face of the unit. At any menu screen, the engine control value 54 for the launch revlimiter engine control 52 may be displayed by pressing one of the launch revlimiter keys 56 or 57. This engine control value 54 may then be changed using the UP key 42 and the DOWN key 46.

FIG. 3 illustrates a typical screen 58 produced when the electronic controller 10 is connected to a computer 8. The engine control groups 40 are set forth in a data tree 60 structure on the screen 58. Individual engine controls 52 are listed below each engine control group 40 as a lower branch of the data tree 60. Branching from the engine control 52 is the last stored or default engine control value 54. An edit indicator dot 62 is located next to each engine control value 54 and changes color, red, when the user has edited the engine control value 54. The engine control value 54 may be selected by placing the pointing cursor 68 of the mouse on any portion of the line or text identifying the engine control value 54.

The computer screen 58 also displays two ignition timing curves, the run timing retard curve 64 and the launch timing retard curve 66. The x-axis represents engine RPM while the y-axis represents degrees of timing retard. Points may be added to the ignition run timing retard curve 64 and the launch ignition curve 66 by placing the pointing cursor 68 using a computer mouse to the desired location on the graph and clicking the right mouse button. Once the right mouse button is clicked, a drop-down point-data window 70 appears which asks the user if a new point is desired. Once a point is added to a graph, the point may be "grabbed" by placing the pointing cursor 68 on the point, and while holding down the left mouse button, dragging the point to the desired position. Points may be added to these curves 64 or 66 at 100 RPM intervals and moved up and down in 0.5 degree intervals.

Also depicted on computer screen 58 shown in FIG. 3 is a graphical representation of the individual cylinder timing retard 72. The y-axis of the bar graph represents the individual cylinders (8, 6 or 4) and the x-axis depicts degrees of retard timing. The computer screen 58 also includes a graphical tachometer 74 and an ignition timing retard degree dial 76 which during operation of the engine 4 displays a real-time presentation of RPM's and corresponding ignition timing retard.

Figure 4A:
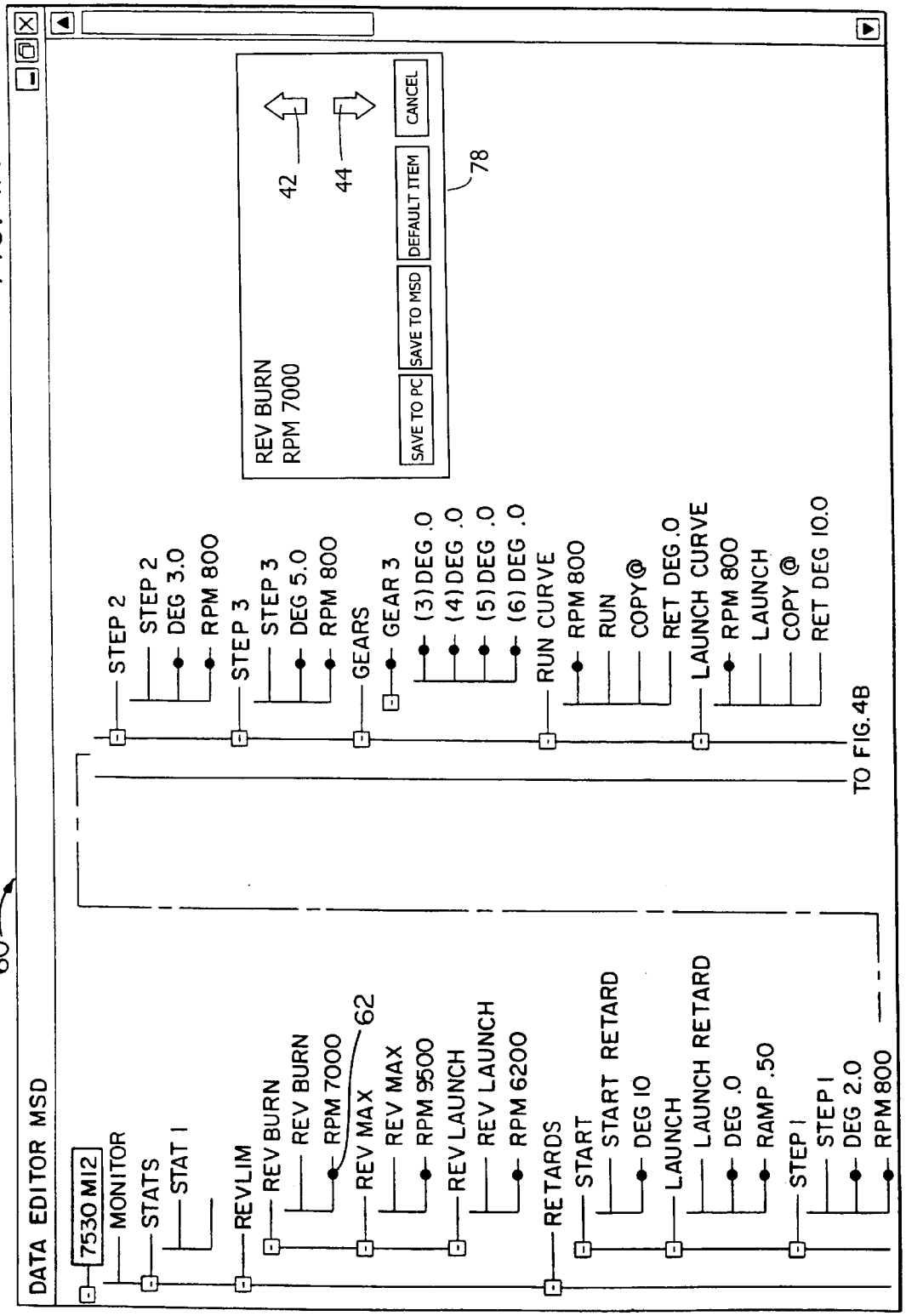
FIGS. 4A and 4B are displays of data menu trees, depicting the engine control groups and engine control value change window.
Figure 4B:
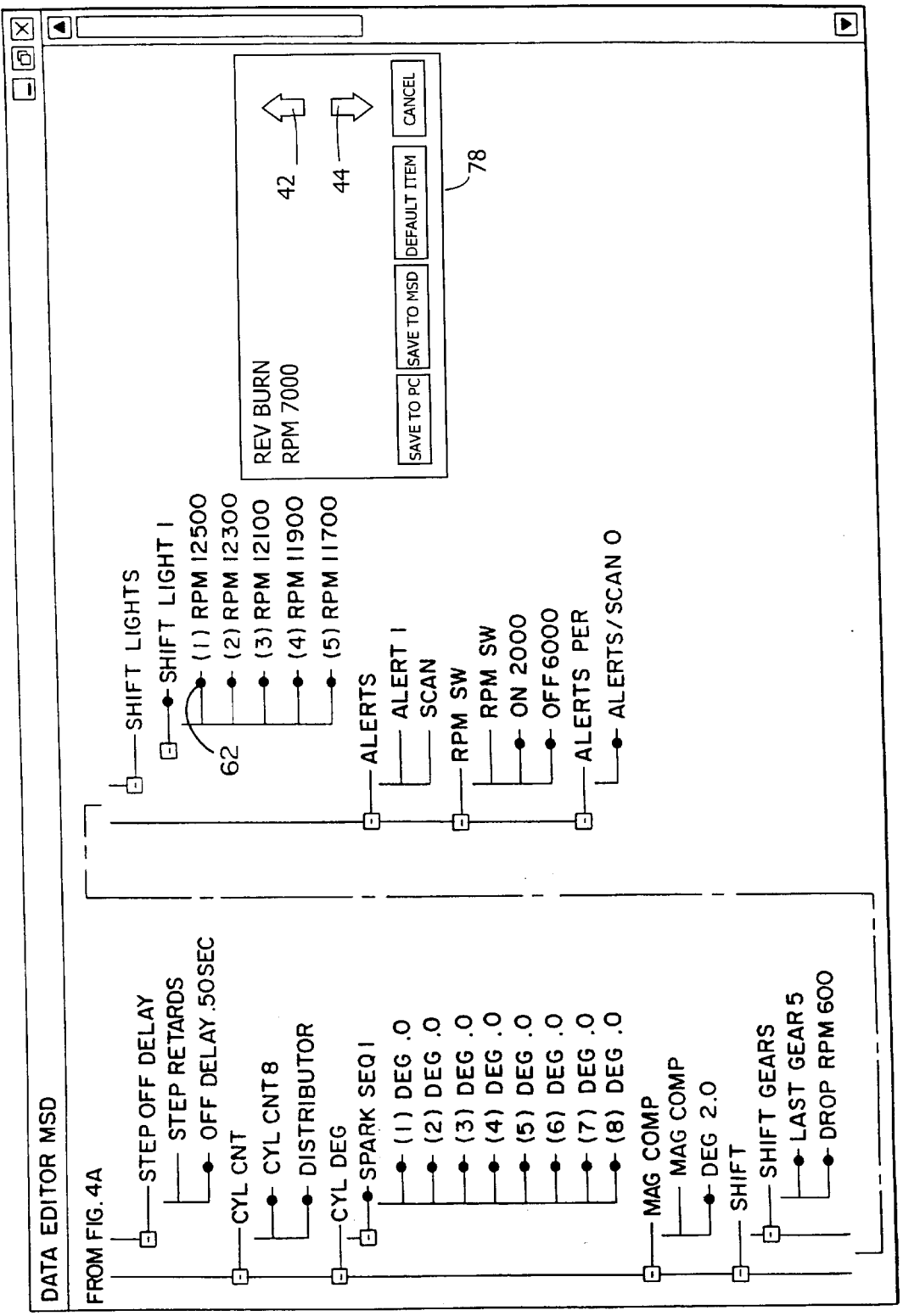

The complete engine control data tree 60 is shown in FIGS. 4A and 4B. Engine controls 52 are changed by placing the mouse point-cursor 68 on any portion of the line with an edit indicator dot 62 located next to the engine control value 54. When the line is clicked with the lefthand button of the computer mouse, a value change window 78 is displayed on the computer screen 58. The value change window 78 displays the engine control 52 and the default or last stored engine control value 54. In the same manner as utilized by the hand-held programmer 6, the engine control parameter values 54 may be increased or decreased by placing the mouse pointing cursor 68 on the graphical UP key 42 or the DOWN key 44 and clicking the mouse. One click of the mouse 42 increases or decreases the engine control value 54 by the smallest increment for that particular engine control 52(i.e., 1 degree, 0.1 degree, 100 RPM, etc.). Once the value has been edited, the color of the edit indicator dot 62 changes to red to signify that the racer has changed that engine control value 54. Unlike the hand-held programmer 6, the engine control value 54 could also be changed by typing the value directly using a computer keyboard. The default factory engine control values 54, the value range and the minimum increment of each engine control value 54 is listed below:

| Engine Control | Default Value | Value Range | Increment |
|---|---|---|---|
| ShiftLight1 | 12,500 | 2,000–12,500 | 100 RPM |
| ShiftLight2 | 12,300 | 2,000–12,500 | 100 RPM |
| ShiftLight3 | 12,100 | 2,000–12,500 | 100 RPM |
| ShiftLight4 | 11,900 | 2,000–12,500 | 100 RPM |
| ShiftLight5 | 11,700 | 2,000–12,500 | 100 RPM |
| Gears | 5 | 1–6 | 1 |
| Gear 3 | (Retard) | 0–5.0 | 0.1 deg. |
| Gear 4 | 0 | 0–5.0 | 0.1 deg. |
| Gear 5 | 0 | 0–5.0 | 0.1 deg. |
| Gear 6 | 0 | 0–5.0 | 0.1 deg. |
| MagComp | 2.0 | 0–3 | 0.5 deg. |
| RevBurn | 7,000 | 2,000–12,500 | 100 RPM |
| RevLaunch | 6,200 | 2,000–12,500 | 100 RPM |
| RevMax | 9,500 | 2,000–12,500 | 100 RPM |
| RetStart | 10 | 0–25 | 0.5 deg. |
| Retard1 | 2.0 | 0–15.0 | 0.5 deg. |
| Retard2 | 3.0 | 0–15.0 | 0.5 deg. |
| Retard3 | 5.0 | 0–15.0 | 0.5 deg. |
| Retard1 | 800 | 800–12,500 | 100 RPM |
| Retard2 | 800 | 800–12,500 | 100 RPM |
| Retard3 | 800 | 800–12,500 | 100 RPM |
| RetLaunch | 0.0 | 0–15.0 | 0.5 deg. |
| RampTiming | 0.50 | 0–2.50 | 0.01 sec. |
| Spark1 | 0 | 0–5.0 | 0.1 deg. |
| Spark2 | 0 | 0–5.0 | 0.1 deg. |
| Spark3 | 0 | 0–5.0 | 0.1 deg. |
| Spark4 | 0 | 0–5.0 | 0.1 deg. |
| Spark5 | 0 | 0–5.0 | 0.1 deg. |
| Spark6 | 0 | 0–5.0 | 0.1 deg. |
| Spark7 | 0 | 0–5.0 | 0.1 deg. |
| Spark8 | 0 | 0–5.0 | 0.1 deg. |
| CylCnt | 8 | 4/6/8 | |
| Distributor | Distributor | Distributor or Crank Trigger | |
| DropRpm | 600 | 500–1500 | 100 RPM |
| RunCurve | 800 | 800–12500 | 100 RPM |
| RunCurve | 0 | 0.0–25.0 | 0.1 deg. |
| LaunchCurve | 800 | 800–12500 | 100 RPM |
| LaunchCurve | 0 | 0.0–25.0 | 0.1 deg. |
| StepOffDelay | 0.50 | 0–2.50 | 0.01 sec. |
| RpmSw On | 2,000 | 2,000–12,500 | 100 RPM |
| RpmSw Off | 6,000 | 2,000–12,500 | 100 RPM |

Figure 5A:
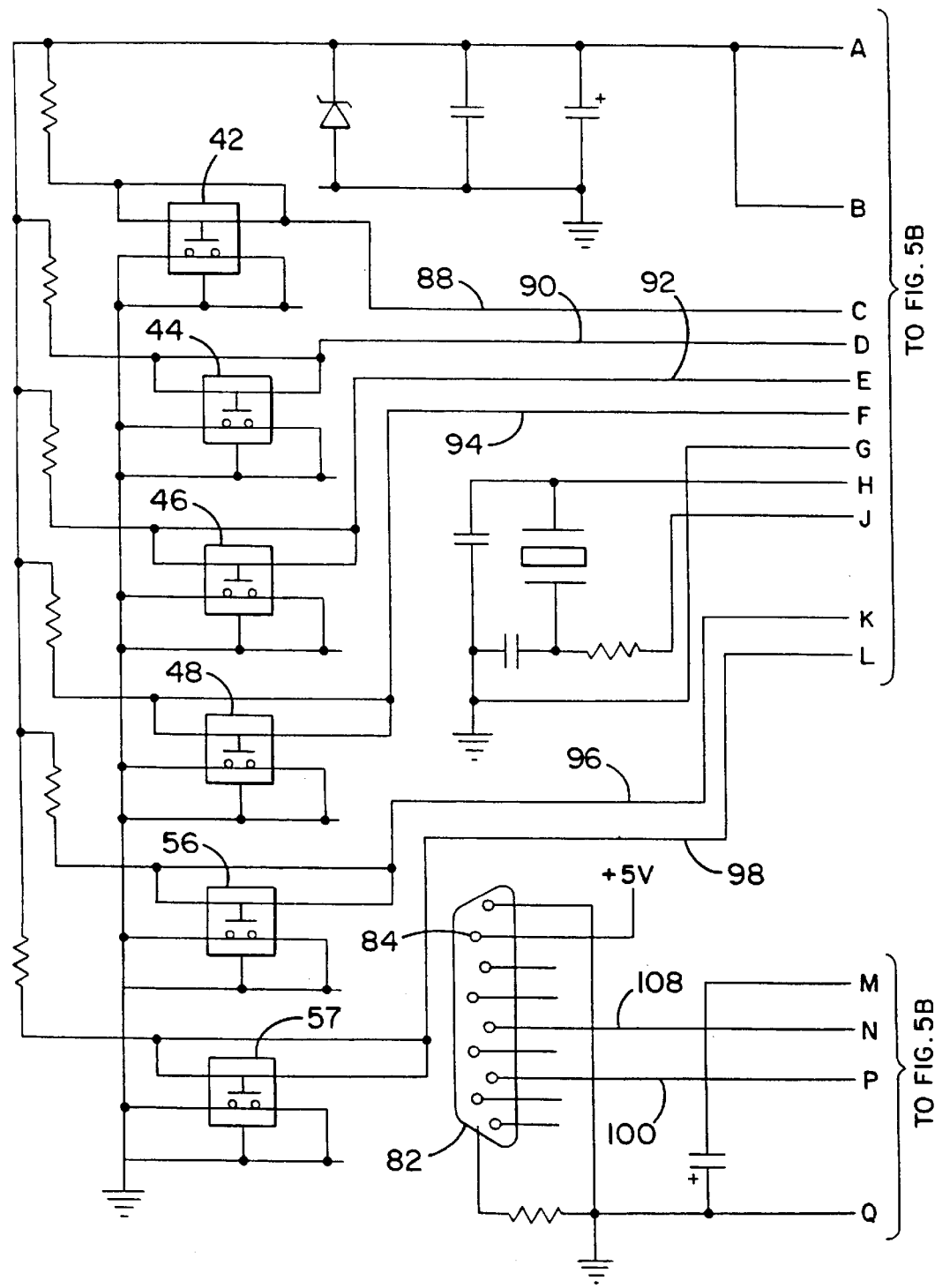
FIGS. 5A and 5B are schematic diagrams for circuitry of the hand-held programmer in accordance with the invention.
Figure 5B:
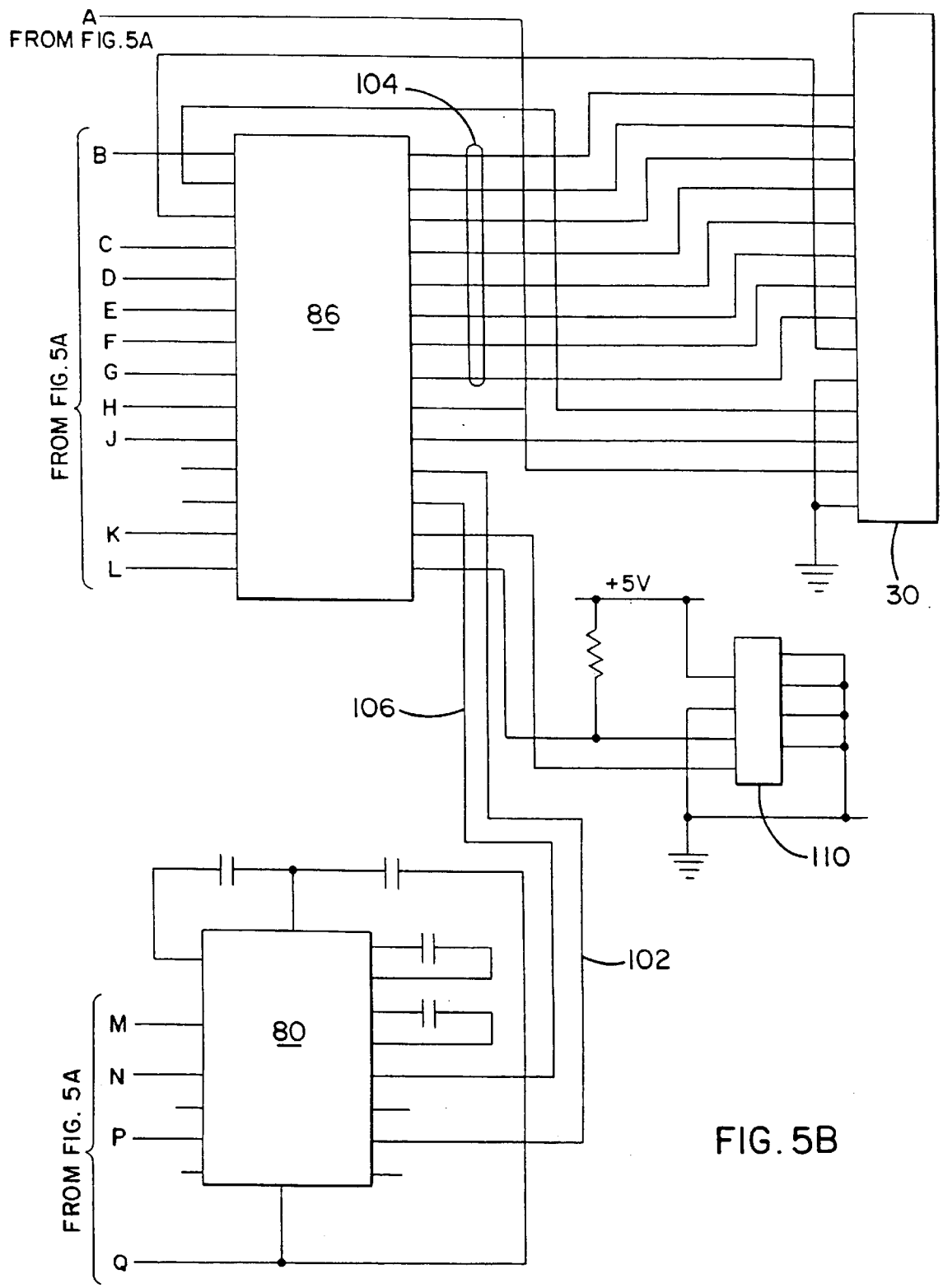

FIGS. 5A and 5B are schematic diagrams for the circuitry of the hand-held programmer 6 which communicated with the electronic controller 10 and interfaces with the user via the LCD display 38. The hand-held programmer 6 communicates with the electronic controller 10 using a standard RS232 driver and receiver 80 and interfaces with the electronic controller 10 using a nine pin serial (DB-9) connection 82. The electronic controller 10 provides a +5 volt signal via the serial connection 82 at input terminal 84 to power the RS232 drive and receiver 80. As is well known, the RS232 driver and receiver 80 generates the proper voltage levels for the microcontroller 86, switches 42–56 and the LCD display 38. In one form, a MicroChip PIC 16C63A 8-bit CMOS mnicrocontroller was utilized.

Various receive and control paths are used by microcontroller 86 to receive user inputs, electronic controller 10 inputs, to control LCD screen 38, and send data to electronic controller 10. A switch input path 88 provides a user input from UP key 42, switch input path 90 provides a user input from DOWN key 44, switch input path 92 provides a user input from NEXT key 46, switch input path 94 provides a user input from ENTER key 48, switch input path 96 provides a user input from LAUNCH REV LIMITER key 56 and switch input path 98 provides a user input from LAUNCH REV LIMITER key 57. The electronic controller 10 communicates via the data connection 12 and input path 100 provides input to the RS232 driver and receiver 80. In return, the RS232 driver and receiver 80 sends the data to the microcontroller 86 via input path 102. Control path 104 allows micro-controller 86 to control the display of LCD display 38 and produce words for the user to read. Microcontroller 86 sends outputs via send path 106 to the RS232 driver and receiver 80 which, in return, is sent via send path 108 to the electronic controller 10.

The hand-held programmer 6 illustrated in FIG. 5 is an in-house unit used for development purposes. This unit contains non-volatile memory 110, MicroChip 24LC65, CMOS Smart Serial™ EEPROM, which is used as an on-board EEPROM loader for in-house programming of production hand-held programmers.

FIGS. 6A–6G are schematic diagrams of the circuitry for the electronic controller 10 used to control RPMs, ignition sparking, ignition timing spark retard, and switches of the internal combustion engine 4 during various stages of a drag race. Data is transferred from either the hand-held programmer 6, computer 8, or the in-car dial module via the data connection 12 through a 9-pin serial connector 112. A RS232 driver and receiver 114 provides the proper voltages to a microcontroller 116 used to control the functions of the electronic controller 10. One form of the electronic controller 10 utilized MicroChip PIC 16C76 8-bit CMOS microcontroller with analog-to-digital converter. Microcontroller 116 contains 368 bytes of RAM and utilizes electronic programmable read-only memory (EEPROM) to store and execute the program used to control the engine 4. Engine control values 54 are stored in a non-volatile memory 118. One form of the electronic controller 10 used a MicroChip 64K 2.5V CMOS Smart Serial™ EEPROM. Microcontroller 116 controls the data transmissions to non-volatile memory 118 by generating a serial clock signal. Data connection 120 provides the serial clock signal to non-volatile memory 118. When data connection 120 is high, non-volatile memory 118 will receive data via data connection 122.

As described earlier, the engine control parameter groups 46 are organized in the menu tree 60 and values are stored in non-volatile memory 118 of the electronic controller 10 which communicates the values to the computer 8 or hand-held programmer 6. The non-volatile memory 118 of the electronic controller 10 is organized as pages of the preferred form contains 32 pages of 256 bytes each with the following reserved locations:

Page 0 00–15 EEPROM
Page 0 16 Alerts per scan
Page 0 17–24 Alert select list
Page 0 25–29 Spare
Page 0 30–31 Monitor hold select
Page 0 32–47 Monitor select list
Page 0 48 Stat select
Page 1 00–15 Text name of menu part number and version To allow future changes and upgrades, the directory accommodates changes in menu sizes without requiring changes to the hand-held programmer 6 or the software used by the computer 8. The EEPROM directory is listed below.

0 eeProm page number of product data values
1 eeProm page number of product default values
2 eeProm page number of product undo mirror
3 eeProm page number of "menu fields" for hand-held programmer 6
4 eeProm page number of "format selects" for hand-held programmer 6
5 eeProm page number of "data selects" for hand-held programmer 6
6 eeProm page number of "table indexes" for hand-held programmer 6
7 eeProm page number of "action tables" for hand-held programmer 6
8 eeProm page number of storage area for computer 8

Returning to FIGS. 6A–6G, battery 14 provides the DC current of sufficient power to power the internal circuitry of the electronic controller 10 including the ignition power and convertor circuitry and coil driver circuit which function as a programmable electronic ignition. The present ignition power, converter and coil driver circuitry is substantially similar to that disclosed in co-pending U.S. application Ser. No. 09/182,984, and assigned to the assignee of the present invention, which disclosure is incorporated as if reproduced in its entirety herein. The electronic controller 10 also contains the necessary circuitry to provide input signals to shift light 34 or automatic transmission shift controller 36, a tachometer 33, and an RPM switch.

The power circuit of the electronic controller 10 includes a current mode control integrated circuit (IC) 128 which may be a UCC 3803 or 3805 BiCMOS available from Unitrode. The ignition input 130 is supplied by battery 14 which is a typical 12.6 volt lead-acid automotive battery. Current is supplied to the electronic controller 10 from battery 14 at battery positive input 132 and battery ground 134. This ignition input 130 voltage ranges from a low of about 6 volts during cold cranking to as high as 16 volts during overcharge at cold temperatures. The ignition input 130 is also subject to "load dump" and transient voltages as high as +/−200 volts for microseconds duration. The load dump condition may increase the battery level to as high as +150 volts for up to 50 milliseconds. The ignition input 130 is also subject to being connected with reverse polarity of the battery input wires and battery charging terminals. Accordingly, a variety of input protection circuitry is provided.

The power circuit is first protected from battery polarity reversal by using a high current power MOSFET 136 that is reverse-biased when the battery is connected backwards. The diode of the power MOSFET 136 blocks the reverse potential and provides protection for all the circuitry of the electronic controller 10. A Zener diode 138 clamps the gate of MOSFET 136 to a maximum of 14 volts for gate protection and resistor 140 limits the current through diode 138 thereby fully protecting the power transistor of MOSFET 136 from voltage spikes present on the ignition input 130 wire.

Zener diode 142 acts as a second input protection device, functioning as a transient surge absorber. Diode 142 is capable of absorbing and clamping an alternator's (not shown) "load dump" output. Diode 142 is, for example, a 6KA24, available from General Instrument, Inc., and is rated at 6000 watt clamping power for 50 milliseconds at 45 volts maximum clamp voltage. Zener diode 142 begins clamping above 26 volts input. Therefore, the ignition must be capable of operation up to this input voltage for limited duty cycle. Also, Zener diode 142 protects the circuit from negative voltages greater than the avalanche breakdown voltage of the transistor of MOSFET 136. Resistor 144 may also be used to provide an RC time constant or filter effect at the gate of MOSFET 136. This ensures that the battery input 132 noise will not discharge the gate voltage of MOSFET 136 under normal operation. This ensures that MOSFET 136 stays fully enhanced (on).

The convertor section of the ignition circuit of electronic controller 10 is a high frequency flyback step-up convertor. It includes the current mode control IC 128 and input power conditioning, clamping components, temperature feedback sensing, $R_{dson}$ current feedback sensing, over-voltage shutdown and under-voltage fold-back circuits. Also included are a powdered metal-power toroid transformer 146, power MOSFET switching transistor 148 (a 75 volt, 71 ampere rated transistor), output snubber circuitry 150, power diode 152, and output capacitors 154 and 156. As mentioned above, the control IC 128 is a Unitrode UCC3803 or UCC3805 current mode control BiCMOS device. This control IC 128 controls the operation of the convertor to convert the battery input 132 voltage to a potential of 525–540 volts DC, which is stored in the output capacitors 154 and 156. These capacitors are 630 volt, 0.47 microfarad, pulse rated MKP type.

The convertor is a "flyback type" which stores energy in transformer 146 primary winding when MOSFET transistor 148 is on and transfers the energy to the secondary winding when MOSFET transistor 148 turns off, which in return, charges capacitors 154 and 156. This occurs at a frequency between 40 kHz and 110 kHz. The charge time from zero volts to 535 volts is typically less than 750 microseconds with the battery input 132 at 14 volts DC. This gives an energy stored in 154 and 156 of Capacitance×(Voltage)2= Joules. At 535 volts and 1.36 microfarad, 194 millijoules of energy are stored that can be switched to the ignition coil 32 primary connected to the ignition output wires 158 and 159. The control IC 128 operates in fixed off-time-variable frequency current mode for providing stable operation from the minimum start-up voltage of 4.5 volts to over 24 volts input. As the voltage begins to ramp up at capacitors 154 and 156, the convertor frequency starts at a high frequency of about 100 kHz with a very narrow duty cycle, or on time, of a few microseconds. As the voltage ramps up, the frequency gradually lowers to about 40 kHz at cut off when capacitors 154 and 156 reach full charge of 525–535 volts. The fixed off-time is set at about 9 microseconds, giving enough time for the transfer of primary energy to the secondary of transformer 146 before the primary current is turned back on.

The converter operates by turning on the output at pin 6 of the control IC 128 to bias the gate of MOSFET 148 on, allowing primary current to flow in transformer 146. The output pin 6 also biases the base of the transistor 162 on which clamps the oscillator input pin 4 of control IC 128 in the reset state. Pin 6 biases the base of the transistor 164 on which clamps the base of transistor 166 off thereby allowing the voltage at the anode of diode 168 to rise to the on state. This forms a voltage drop across MOSFET 148 plus a 0.6 volt forward drop of diode 168. The voltage at diode 168 is representative of the current flowing through the transistor MOSFET 148 (i.e., $I=V/R_{dson}$). This voltage is used for current feedback at pin 3 of the control IC 128. Resistors 172 and 174 form a voltage divider at input pin 3 of control IC 128. As MOSFET 148 current ramps up, the voltage across the drain-source terminals rises until control IC 128 pin 3 voltage is equal to the internal comparator voltage which is seen, in part, at pin 1 (comp) of control IC 128. The voltage level at pin 1 is compared internally to pin 3 voltage and when pin 3 voltage exceeds pin 1 internal voltage, the comparator resets the output latch. This turns off output pin 6 of control IC 128 and MOSFET transistor 148. This action attempts to maintain a constant current flowing through MOSFET transistor 148 and the winding of transformer 146.

When pin 6 of control IC 128 goes low, the gate of MOSFET transistor 162 is biased off and the oscillator begins to ramp up the voltage at pin 4 of control IC 128. This time period is the fixed off-time because it now takes approximately 9 microseconds until the voltage level on pin 4 triggers the internal comparator again to set the output latch on. This off-time is controlled by MOSFET transistor 162 turning off and resistor 176 charging up capacitor 178 until the internal oscillator threshold is reached to set the output latch on. When control IC 128 output pin 6 goes low, the base of the transistor 164 is quickly biased off and allows the base of the transistor 166 to bias on; transistor 168 then clamps the voltage at the anode of diode 168, bringing the voltage at pin 3, the current sense input pin of control IC 128, to near ground potential (i.e., about 0.6 to 0.8 volts clamped). The purpose of capacitor 180, resistor 182 and diode 184 is to allow quick turn off of transistor 164 while providing a small delay during the turn on of MOSFET 148. Also, capacitor 180 must charge to 0.6 volt through resistor 182 before transistor 164 is biased on. The time delay from control IC 128 pin 6 going high to transistor 166 turning off is about 250 nanoseconds. This allows MOSFET 148 to fully turn on before transistor 166 unclamps the current sense input at the anode of diode 168. Resistors 186, 182, 188, transistors 164, 166, diodes 168, 184 and capacitor 180 form a current sense feedback circuitry that enable the use of the resistance of the Drain-to-Source terminals of MOSFET 148 in the ON state ($R_{dson}$) for lossless current sensing (without the need for shunt current sense resistors or other current sensing circuitry). Temperature compensation circuitry 200 nulls the increase in resistance of MOSFET 148 $R_{dson}$ as temperature rises.

The control IC 128 pin 1 voltage is also compensated by the battery input 132 voltage. When the battery input 132 voltage falls below 10 volts, pin 1 voltage is lowered to track the battery input 132 voltage to prevent the convertor from demanding more current than is possible. Since the convertor must ramp the current up to a constant level each cycle, the convertor must be able to reach this level for any battery voltage input 132 within the operating range (typically 6 to 24 volts). At above 10 volts, power MOSFET 148 is fully turned on with a gate drive over 10 Vgs. But as battery input 132 falls below 10 volts, MOSFET transistor 148 cannot be fully enhanced and thus, the current level must be derated to keep power MOSFET 148 in a safe area operation mode.

This is accomplished by low voltage protection circuit 202. At approximately 6.5 volts, the convertor current is lowered to a level of about half of the 14 volt level which requires the charge time to double to charge capacitors 154 and 156 to the 535 volt output value. Also, at this low battery input 132 condition, power MOSFET 148 is approximately 75% enhanced, but is still able to reach the current trip level to reset the internal current comparator of control IC 128 and operate in the current mode with reduced current to drive transformer 146. This provides safe operation of power MOSFET 148 below 10 volts input thereby preventing current runaway. Power MOSFET 148 also provides protection from current runaway conditions when power MOSFET 148 is not fully enhanced at low gate drive levels when the voltage across the Drain-to-Source terminals of MOSFET 148 in the ON state, drives ($V_{dson}$) higher which, in turn, feeds the current sense circuit and turns the output off at lower current levels. Thus, the circuit is self-protecting using $R_{dson}$ as a current sensing mechanism.

The voltage of capacitors 154 and 156 is regulated to the 525–535 volt level by voltage feedback circuitry 204. When the capacitor voltage rises to just over the reverse breakdown voltage of the Zener string in feedback circuit 204 approximately 20 volts, the base of transistor 206 is biased on and the collector of transistor 206 clamps pin 1 of control IC 128 to near ground. When pin 1 falls below 1 volt, the convertor is shut down and stops charging capacitor 154 and 156. Also, capacitor 208 on pin 1 provides a small delay of about 20 microseconds with a rise time to pin 1 voltage of about 50 micro-seconds that provides a soft start of the convertor when it turns back on to recharge capacitors 154 and 156.

Since operation with high battery input voltages is undesirable, the ignition circuit of the electronic controller 10 is designed to shut down the converter section at about 27–29 volts, thereby keeping the voltage levels at the drain-source of power MOSFET 148 under its maximum rated voltage. When the transistor of power MOSFET 148 turns off after conducting current through the primary winding of transformer 146, the voltage quickly rises to a level that is clamped by the action of the mutual inductance of the secondary of transformer 146 which is increasing up to 535–540 volts output. The turns ratio of the transformer 146 limits the maximum voltage that is generated across the primary winding when the transistor of power MOSFET 18 turns off. In particular, the turns ratio of transformer 146 may be, for example, 18.75:1. Thus at the maximum secondary output of 540 volts, the primary voltage rises to (secondary volts/turns ratio=volts primary)=28.8 volts. The drain voltage transistor of power MOSFET 148 rises to primary volts+(high) battery volts=28.8+29 volts=57.8 volts, well below the maximum rated 75 volt device breakdown.

The convertor is shut down above 29 volt input level by the circuit of resistors 210 and 212, diode 214, capacitor 216 and transistor 206 by clamping pin 1, the comp pin, of converter power control IC 128. When the battery voltage rises above the reverse breakdown voltage of Zener diode 214, the base of the transistor 206 is forward biased which clamps pin 1 of the converter control IC 128. When the voltage at pin 1 of converter control IC 128 drops below about 1.2 volts, the gate drive from pin 6 of the converter control IC 128 stops and power MOSFET 148 turns off, halting operation and current flow of the transformer 146 primary. As long as the battery input 132 remains above this voltage level, convertor control IC 128 will be shut down and the ignition cannot provide any ignition coil output. In this condition, the transistor of power MOSFET 148 only has the battery voltage potential applied across the drain-source terminals which is limited by the clamping action of diode transient suppressor 142.

Resistor 212 limits the maximum source current of control IC 128 at pin 1 to a level within control IC's 128 ability to properly regulate the pin 1 output level. In particular, it should be noted that in certain circumstances where battery input 132 voltage exceeds a particular level, such as approximately 12.2 V, control IC 128 may operate improperly or unpredictably. Under clamping conditions, it is undesirable to "hard" clamp pin 1 to ground because control IC 128 loses the ability to control pin 1 current supply and attempts to oversupply the current out of pin 1. This results in a voltage/duty cycle surge when pin 1 is unclamped. Thus, resistor 212 provides a "soft" clamp to pin 1 of control IC 128 and properly shuts down the converter thereby enabling unclamping to resume operation without any surges. Other current limiting components, such as a current diode, may also be used to provide the soft clamp. The voltage may rise to the maximum clamp voltage of about 45 volts without harming the transistor of power MOSFET 148. Capacitor bank 218 also help in clamping the input positive transient. When the capacitor bank 218 is charged to the battery potential and positive transient occurs, the transient must deliver energy to charge capacitor bank 218 to the higher level. The limited energy available in the transient source will effectively be clamped by the capacitor bank 218 before diode 142 begins to conduct a large clamp current. The ESR (equivalent series resistance) of capacitor bank 218 is the primary limiting factor of how effectively the transient can be clamped and the size of the capacitance limits the voltage rise at a given energy input level. As shown, the ESR for the combined input capacitors is 10 milliohm and 4800 microfarad capacitance. The maximum energy that the capacitor bank 218 can absorb at the maximum clamp voltage of diode 146 is: (45 volt-(battery voltage before the transient)$^2$× capacitance/2=Joules absorbed in capacitor bank. At 45 volts using a 14 volt battery at 4800 microfarad capacitance, the maximum energy is 2.3 Joules and the energy absorbed by diode 146 is in addition to this. It is noted that this energy is typically seen only at a "load dump" condition when the battery is disconnected, otherwise the battery would clamp some or most of this energy. The clamp energy required will usually be somewhat less than these maximum values due to the impedances of the battery wiring and PCB wiring resistance. The convertor is also shut down when the output transistor of MOSFET 148 is gated on to discharge capacitors 154 and 156 into ignition coil 32. As will be discussed in greater detail below, this is provided by microcontroller 116 signal "CONV INH" (converter inhibit) which also provides the input to the base of transistor 206, as an Ored input-source from microcontroller 116. The timing of the gate signal "IGN/TRIG" is coincident with the "CONV INH" signal so that the convertor is shut down immediately as the ignition coil 32 switch is biased on. The "CONV INH" signal is turned off low about 30 microseconds before the gates drive turns off IGBT pair 219 thereby allowing the pin 1 voltage level to rise to turn on level just as the gate of IGBT pair 219 is turned off. This prevents wasted time in getting the convertor back up charging capacitors 154 and 156 after just being discharged into the ignition coil 32.

The convertor output section includes rectifying, capacitor storage, and snubber circuitry 150. Diode 152 supplies DC current to capacitors 154 and 156 which are parallel connected for a combined capacitance of 1.36 microfarad, a value selected for physical size, energy storage, and voltage rating. Resistors 220 and 222 provide a discharge path across capacitors 154 and 156 when the convertor is powered off thereby removing the voltage potential so the electronic controller 10 may be handled safely. Snubber circuit 150 clamps the negative secondary voltage of transformer 146 to levels below the breakdown voltage of diode 152 and prevents breakdown of transformer 146 secondary insulation. The negative voltage output on the secondary winding of transformer 146 could reach over 1000 volts if snubber circuit 150 were not functioning. As the negative voltage climbs above 400 volts, diode 224 reaches the reverse breakdown potential and current flows from the secondary through diodes 226 and 224, across capacitor 228 and the resistors. The resistors discharge capacitor 228 each period that transformer 146 primary current is flowing; thus, the potential across capacitor 228 never exceeds about 500 volts. The positive current flow from transformer 146 secondary flows through diode 152, capacitors 154 and 156 and diode 224, 226, and 230, and resister 228 to ground, and through the ignition coil 32 primary when connected to ignition output (C+ and C−) wires 158 and 160.

A charge cycle of the convertor begins when the pin 1 voltage rises to about 1.2 volts. At this time, the "CONV INH" signal is low and transistor 206 is off; this allows the pin 1 voltage to rise across capacitor 208, which is biased by current sources internal to control IC 128 and by the temperature compensation circuit 200 from control IC 128 output pin 84 volt reference. The gate drive signal "IGN/TRIG" goes low about 30 microseconds after the "CONV INH" signal goes low. This allows the voltage at pin 1 to begin to ramp up before the ignition coil switch gate drives are removed (IGBT pair 219). The pin 1 voltage just reaches the internal threshold to set the pin 6 output latch on as the gate drives IGBT pair 219 low. Otherwise, the secondary current would flow to ground through IGBT pair 219 collector-emitter, preventing the capacitors 154 and 156 from recharging. The first output period at pin 6 is very small (only 1–3 microseconds) because the voltage at pin 1 is very low at start-up. This gives the convertor a soft start so the current in transformer 146 primary is gradually ramped up over a period of about 50 microseconds to reach the full current level of operation. This also presents a quieter load to the battery. As the voltage on pin 1 reaches its final value of about 2.2–2.5 volts, the convertor is operating at maximum duty cycle. At a battery input 132 of 14 volts, the duty cycle approaches about 75%, and the operating frequency is at the lowest speed, typically 40 kHz. If the battery input lowers, the duty cycle rises because the current ramps more slowly and requires more time to reach the level required to reset the internal comparator of control IC 128 at current sense input pin 3. The convertor may operate at about 92–94% duty cycle before the battery drops to a level where the battery compensation circuit begins to clamp pin 1 voltage to lower the maximum current through transformer 146. When the convertor has charged capacitors 154 and 156 to about 525 volts, the series of Zener diode string and voltage feed back circuit 204, begin to conduct and current flows to bias the base of transistor 206 on. Transistor 206 clamps pin 1 of control IC 128 and pin 6 goes low to shut the convertor off. The Schottky diode 234 connected between pin 6 and ground protect the output of control IC 128 from negative transients generated when the IGBT pair 219 is rapidly turned on. As long as transistor 206 is on, the convertor will remain off.

At the same time that transistor 206 is biased on, transistor 236 is also biased on which occurs at a capacitor voltage just below the transistor 206 bias voltage. This is due to the higher resistance of resistor 238 as compared to resistor 240, both form a divider wherein resistors 238 and 242 bias transistor 206 and resistors 240 and 244 bias transistor 236. Transistor 236 clamps microcontroller 116 input "MSEN OUT" (multispark enable). When the "MSEN OUT" signal goes low, microcontroller 116 is signaled that the convertor has reached full recharge. When the engine is operating below approximately 3400 RPM, microcontroller 116 has time to "multispark," that is, spark more than once during each ignition cycle. Microcontroller 116 will execute a 20 crankshaft degrees of spark duration. If the "MSEN OUT " signal has gone low and the 20-degree period has not been exceeded, then microcontroller 116 will again provide another gate drive output to IGBT pair 219, thereby discharging the energy stored in capacitors 154 and 156. At the same time, the "CONV INH" signal goes high keeping the convertor off for the coil 32 output period. The multispark process repeats until the end of the 20-degree period. If the "START RETARD" option has been activated, and the engine is below 500 RPM, microcontroller 116 will execute at 10 crankshaft degrees of spark duration.

When the 20-degree (or 10-degree) period is complete, the convertor is operated to recharge capacitors 154 and 156 and, after a limit of 3 milliseconds, "CONV INH" signal from microcontroller 116 goes high to shut the convertor off until the next input to microcontroller 116 signals to trigger the ignition coil 32 again. The "MSEN OUT" signal is used to signal micro-controller 116 that the capacitor bank 154 and 156 has reached full charge. This signal enables microcontroller 116 to indirectly monitor the battery voltage level. When the battery input 132 is above about 10.5 volts, capacitors 154 and 156 recharge in under 975 microseconds. The minimum multispark period is controlled by the microcontroller 116 at 975 micro-seconds with a maximum period of 1.8 milliseconds. If the "MSEN OUT" signal has not gone low at the 975 microsecond time, then microcontroller 116 begins testing the "MSEN OUT" signal, waiting for it to go low so the output can be triggered again. Microcontroller 116 will wait in this mode up to the maximum 1.8 milliseconds and then trigger IGBT pair 219 if the 20-degree (or 10-degree) window has not ended. While in this mode, microcontroller 116 also indicates that the ignition circuit is not reaching full recharge in the standard time (due to low battery input 132) and flashes an LED indicator code "22" to aid in trouble shooting of the ignition circuit, as discussed further below. Thus, the user can see that the battery input 132 is below optimum levels due to loss of battery charge or loose or corroded battery connections.

The output section of the ignition includes an IGBT ignition coil switch of 2 IGBT's in parallel and gate drive circuitry. Each IGBT 232 and 246 is a fast-600 volt, 40 ampere rated IGBT. The use of an IGBT coil switch overcomes many of the limitations of prior SCR switches. The IGBT pair 219 can be turned on and off very fast. The convertor may even be restarted just before the IGBT pair 219 is turned off without causing extra delays due to large inductive ignition coils or failed spark gaps. When the spark fails to jump the spark gap, the primary energy circulates from capacitors 154 and 156, IGBT pair 219, inductor 248, diode 230, resistor 250, and the coil 32 primary until the energy is dissipated or IGBT pair 219 is turned off. If there is still some energy in the primary of coil 32 when IGBT is turned off, the energy can flow back to capacitors 154 and 156, partially recharging these capacitors. Capacitors 154 and 156 act as a snubber for IGBT pair 219 preventing over-voltage across the IGBT pair 219. Resistor 250, parallel to diode 230, insures correct convertor operation when the ignition coil 32 is not connected to the ignition coil input C− and C+ terminals (158 and 160) of the ignition circuit. Resistor 250 provides a safe ground potential for the negative terminals of capacitors 154 and 156 when the ignition coil 32 is not connected or the ignition coil 32 primary is open circuited. With the controlled operation of the convertor, the capacitors 154 and 156 are always properly recharged to the correct level of 525–535 volts.

Further, IGBTs 232 and 246 are in parallel to overcome over heating. When only one IGBT is used, the IGBT may overheat which causes the dye on the IGBT to breakdown thereby causing the current to taper off after 50 microseconds. The two IGBT in parallel, prevents overheating and therefore, allows for more efficient discharge of the capacitors and higher currents.

The IGBT pair 219 require a gate potential of 10 VGE minimum with 15 volts desirable for full peak current capability. This is easily achieved when the battery input 132 is above 10 volts, but requires an additional voltage doubler circuitry 250 to provide the minimum gate drive when below 10 volt battery input 132. Voltage doubler circuit provides the minimum gate drive for the IGBT pair 219 down to an input of 5 volts battery level. At above 10 volt battery input 132, Zener diode 252 clamps the input to voltage converter 254, a 7660 IC CMOS, for power conversion and generation. The resulting voltage is about 20 volts output at the anode of diode 256, label "VGATE on FIG. 6C."

This voltage is connected to a level shifting circuit 258. The micro-controller 116 signal "IGN/TRIG" is a 0–5 volt signal and must be capable of switching the gates of IGBT pair 219 with 0–15 volt levels. The base of transistor 260 is driven from microcontroller 116 from resistor 262. The collector of transistor 260 pulls the base of transistor 264 low which forward biases transistor 264 and enables current flow from the "VGATE" voltage supply through transistor 264 emitter/collector to the anode of transistor 266 and through resistor 268 to the gate of IGBT pair 219, which then biases IGBT pair 219 on. This allows current to flow from the capacitor bank 154 and 156 through the ignition coil 32 primary connected to coil input 158 and 160 (C− and C+) wires. The voltage at the gates of IGBT pair 219 is clamped by the Zener diode 270 to 15 volts maximum and transistor 272 remains off during this time because it is reversed biased. At turn off of IGBT pair 219, microcontroller 116 signal "IGN/TRIG" goes low and transistors 260 and 264 are turned off. The base of transistor 272 is now at ground level (via resistor 274) with the emitter at or near 15 volts. This forward biases transistor 272 emitter/base junction and allows current flow from the gates of IGBT pair 219 to ground through the emitter/collector of transistor 272, thereby lowering the gates of IGBT pair 219 to below 0.7 volts and, effectively turning IGBT pair 219 off. Diode 276 is anti-parallel to the collector/emitter of IGBT pair 219. This clamps any negative voltage across IGBT pair 219 to under 1 volt providing protection for IGBT pair 219 and blocks any positive current flow when the capacitor bank 154 and 156 is recharged. The diode 276 commutates any residual ignition coil energy by directing the inductive energy to recharge the capacitor bank, 154 and 156 from negative coil output 160 through diode 276 anode to capacitors 154 and 156 positive terminals.

The power supply filtering circuit 278 for the microcontroller includes three capacitors and a choke 280. These components prefilter the noise generated in the power section on the +12 voltage input to the microcontroller regulator input. The battery input is further filtered by capacitors 282, 284, and 286, RF filter 288, and reverse protected by diode 294 and clamped by Zener diode 292, before supplied to the input of the precision 5 volt regulator 294. Resistor 300 provides a current limiting impedance for the 24 volt Zener diode 302. The RF filter 288 is a high frequency inductive/capacitive filter to attenuate frequencies above 10 MHZ on the input supply line. The 5 volt regulator 294 is a low dropout type with a tight +/−0.5% regulation of the 5 volt output. This insures that micro-controller 116 operates near the optimum supply input requirements even at the lowest input battery levels. For 5 volt output, the battery may drop to about 5.7–5.8 volts. Microcontroller 116 incorporates brown-out-detection and will reset when the 5 volt supply drops to less than 4 volts. This allows microcontroller 116 to function down to about a 5 volt battery input level. Capacitors 304, 306, 308, 310 and 312 provide 5 volt supply filtering for the microcontroller 116. The placement of these capacitors near the micro-controller's 116 power supply pins are important for noise immunity.

Protection components for microcontroller 116 also include Schottky diodes 314, 316, 318, 320, 322, 324 and Zener diode 326. The Schottky diodes 318, 320, 314 and 316 clamp any negative or positive transients greater than +/−0.3 volt above the 5 volt supply or ground to protect the I/O pins of microcontroller 116. Diode 322 clamps any negative transients on pin 23 of microcontroller 116 and diode 324 blocks any positive levels or transients on pin 23. The Zener diode 326 clamps the 5 volt supply to a maximum of 5.6 volts to protect microcontroller 116.

Microcontroller 116 functions to accept inputs for triggering the output, enabling operation up to the preset and user inputted revolution limiter values, enabling timing retard, and individual cylinder timing retard, controlling of the multispark operation, and shifting outputs. The inputs include PTS1, MAG PICKUP INPUT, BURN REV LIM, LAUNCH REV LIM, NO. 1 STEP RETARD, NO. 2 STEP RETARD, NO. 3 STEP RETARD, CAM PICKUP, and MSEN-IN. The outputs include TACH OUT, CONV INH, IGN/TRIG, LED, RPM SW, and SHIFT LIGHT OUT.

The electronic controller 10 is user programmable and includes programmable features such as revlimit controls, ignition timing retards, individual cylinder timing retards, an RPM activated switch, and gear shift controls as described further below.

The hand-held programmer 6 or computer 8 is used to input and store the revolutions per minute controls and is described in further detail below. The burn out revlimit is activated when the input of BURN REV LIM 328 is pulled high to +12 volts (or any battery potential above 4.5 volts). Likewise, the launch revlimit is activated when the input of LAUNCH REV LIM 330 is pulled high to +12 volts (or any battery potential above 4.5 volts). Each may be set to values from 2,000 to 12,500 RPM in 100 RPM increments. These inputs are debounced in microcontroller 116 to ensure clean revlimiter selection and reject any noise that may be seen by microcontroller 116 at the input pin. When +12 volts (or any battery potential above 4.5 volts) biasing both BURN REV LIM 328 and LAUNCH REV LIM 330, the maximum revlimit (REVMAX) controls the maximum RPM the engine may turn at any time; REVMAX may be set from 2,000 to 12,500 RPM in 100 RPM increments. The LAUNCH REV LIM 330 also functions to activate the launch retard timing function and launch timing curve, discussed further below.

The electronic controller 10 also acts as a multi-stage retard. The STEP RETARD No. 1 through 3 input selects the retard value stored in non-volatile memory 118 to retard the ignition spark output when the STEP RETARD No.1 (332), No. 2 (334) or No.3 (336) is pulled high (above 4.5 volts).

Like the REV LIM inputs, these inputs are also debounced by micro-controller 116 to ensure proper selection of the STEP RETARD function and rejection of noise. The STEP RETARD functions are programmable from 800 to 12,000 RPM with each retard being adjustable from 0 to 15 degrees in 0.5 degree increments. When activated, each STEP RETARD is added to the previous retard to reach a maximum of 25 degrees. For example, with STEP RETARD No. 1 set at 10 degrees at 1,000 RPM, STEP RETARD No. 2 at 5 degrees at 2,000 RPM and STEP RETARD No. 3 at 2 degrees at 5,500 RPM is equivalent to 15 degrees retard when RPM's reach 2,000 and 17 degrees retard at 5,500 RPM. The electronic controller 10 also allows the user to delay the activation of the STEP RETARD feature. The time delay may be set from 0 to 2.50 seconds in 0.01 second increments and is useful in engine applications using nitrous to ensure that the nitrous has stopped flowing through the engine before deactivating the STEP RETARD.

The REV LIM and STEP RETARD controls input circuits 328, 330, 332, 334, and 336 are identical in component layout and operation. The BURN OUT and LAUNCH LIM input circuits 328 and 330 includes resistors 338–348 and 356, capacitors 354 and 358, diode 352, and half of the LM393 bipolar voltage comparator IC 350. The inverting input at pin 2 is biased at 2.2 volts by resistors 342 and 346 divider pair from the 5 volt supply. The resistor 338 provides a pull up of the output pin 1 to the 5 volt supply and resistor 340 provides positive feedback to the input pin 3. The input to pin 3 includes a resistor divider pair 348 and 356, that divides the input to half of the input terminal voltage. Diode 352 clamps the maximum voltage at the input resistor 344 on pin 3 to 5 volts, providing overdrive protection for comparator IC 350. When the input at the non-inverting input, pin 3, exceeds 2.2 volts, the output pin 1 goes high to 5 volt, driving pin 26 of microcontroller 116 high, while microcontroller 116 is scanning the REV LIM input pin. The hysteresis action from the feedback resistor 340 helps to sharpen the switching edges at the switching thresholds of the input signal and also helps to reduce bouncing of the output due to noise on the input pin. Capacitor 358 helps to filter some of the high frequency noise at microcontroller 116 input pin and while delaying the rise time at pin 1 by about 4 microseconds.

The STEP RETARDS No. 1–3 input circuits 360, 362, and 364 (FIG. 6G) are identical in component layout and operation. The STEP RETARD No. 1 input circuit 360 includes components resistors 368–378 and 386, diode 380, capacitors 382 and 384 and half of a LM393 bipolar voltage comparator IC 390. The inverting input at pin 2 is biased at 2.2 volts by resistors 372 and 376 divider pair from the 5 volt supply. Resistor 368 provides a pull up of the output pin 1 to the 5 volt supply and resistor 370 provides positive feedback to the input pin 3. The input to pin 3 includes a resistor divider pair 378 and 386, that divides the input to half of the input terminal voltage. Diode 380 clamps the maximum voltage at the input resistor 374 on pin 3 to 5 volts, thereby providing overdrive protection for the comparator IC 390. When the input at the non-inverting input, pin 3, exceeds 2.2 volts, the output pin 1 goes high to 5 volts, driving pin 26 of microcontroller 116 high, while the microcontroller 116 is scanning the STEP RETARD 1 input pin. The hysteresis action from the feedback resistor 370 helps to sharpen the switching edges at the switching thresholds of the input signal and also helps to reduce bouncing of the output due to noise on the input pin. The capacitor 382 helps to filter some of the high frequency noise at microcontroller 116 input pin while only delaying the rise time at pin 1 by about 4 microseconds.

Microcontroller 116 also executes a user adjustable START RETARD that is automatically enabled and adjustable from 0 to 25 degrees of crank-shaft rotation. When the engine is operating below 500 RPM, the ignition timing is retarded to the user inputted degrees until the engine reaches 800 RPM when timing is returned to full (non-retarded) timing. The RPM must drop back below 500 RPM to reactivate the START RETARD feature. When the START RETARD is active, the multispark is decreased from 20 degrees to 10 degrees wide to help prevent crossfire in the distributor cap.

The ignition run timing retard curve 64 allows the user to program a full timing curve from 800 RPM to 12,500 RPM in 100 RPM and 0.1 degree increments. (When the engine RPM falls below 500 RPMs, the START RETARD feature is activated and will control the start up ignition timing.) The ignition run timing curve 64 may be programmed to a maximum of 25 degrees of ignition retard. The user may program the ignition run timing curve 64 using the hand-held programmers, by inputting the RPM value and selecting the enter key 50. The hand-held programmer 6 will then prompt the user to input the timing retard value. Once inputted, this value is stored in non-volatile memory 118. The user may input as many points that are necessary for the particular application and the electronic controller 10 extrapolates a curve based on those points. Likewise, the ignition run timing curve 64 may also be programmed using a computer 8 and a mouse as described previously. The user simply places the mouse pointer 68 to the approximate position of the desired RPM and timing value on the curve 64 and adds a point. Again, the user may input as many points as desired between 0 and 12,500 RPM in 100 RPM increments. During operation of the engine 4 the total ignition retard values can be monitored on either the hand-held programmer 6 or on the computer screen 58 on ignition timing retard degree dial 76.

The ignition timing retard launch curve 66, as seen on the computer screen 58 functions similarly to the ignition run timing retard curve 64. When the ignition timing retard launch curve function is activated, the ignition run curve 64 function is deactivated thereby allowing the launch curve to control ignition timing until the first shift in gear is detected. The ignition timing retard launch curve 66 may be programmed from 800 to 12,500 RPM in increments of 0.1 degree to a maximum of 25 degrees. All ignition timing retards values are additive. Thus, if a step retard is activated during either the ignition run or launch curves, that value is added to the corresponding RPM retard value of the curve.

Lastly, another method of controlling ignition timing at the launch is the launch retard ramp function. This feature allows the ignition timing to ramp from a programmed launch retard value to the ignition timing retard launch curve. The user may set the ramp time duration from 0.00 to 2.50 seconds in 0.010 second increments. When the LAUNCH REV LIM is high, any programmed retards are added to the ignition timing. However, when the launch retard ramp function is deactivated by the LAUNCH REV LIM signal going low, the launch retard ramp function gradually removes or ramps up the timing retards over the programmed time duration.

Turning to the PTS1 input circuit 392 this circuit also uses a voltage comparator 394, such as a MC33072 op amp, to sense the input trigger from the engine points signal, which could be from mechanical points, or an ECU (electronic control unit) coil driver. The PTS1 input circuit 392 includes components resistors 396–408, diodes 410–414, and capacitors 416 and 418. Resistor 408 provides a pull-up current source of about 140 milliamperes from a 14 volt battery. This results in the input level equal to the battery potential from the PTS1 driver (points/ECU signal) at the anodes of diodes 412 and 414. This signal is then directed to the input pin 2 of voltage comparator 394 by limiting resistor 406 and clamped to 5.1 volts maximum by Zener diode 410. The capacitor 418 provides input debounce on the leading edge of the PTS1 signal and a large amount of debounce on the trailing edge. When the PTS1 signal goes high, capacitor 418 quickly charges to above the 3 volts threshold through resistor 406 to switch the output at pin 1 to low. This occurs in about 2 microseconds so the delay from input to ignition output is held to a minimum. When the PTS1 signal goes low, capacitor 418 begins discharging through large resistor 404 and requires at least 120 microseconds before the input at pin 2 falls below the 3 volt threshold at pin 3. This provides an initial debounce period. Micro-controller 116 further inhibits all inputs after a valid trigger edge input for greater than 45 to 60 degrees, depending upon engine RPM, to reject any noise during the spark output time period that may get through the hardware debounce. This combination of hardware and software provides an adequate debounce period for most mechanical ignition breaker points to eliminate false triggering of the ignition.

Microcontroller 116 has two inputs from which the ignition may trigger: PTS1 and MAG PICKUP/CRANK TRIGGER input. The MAG PICKUP is the magnetic sensor located in the distributor while the CRANK TRIGGER is the magnetic crank trigger sensor 18. Only one of these two inputs is allowed to act as the trigger input, and is used to interrupt microcontroller 116. The system may use an adaptive debounce technique for enabling the debounce time on the trailing edge to be reduced from a predetermined maximum time to lesser times as engine speed increases. For example, each time the interrupt routine is executed, a timer may be used to measure the amount of time taken by the trailing edge debounce function. Accordingly, as the engine speed increases, the debounce time can be lessened during subsequent executions of the interrupt routine. Thus, excess debounce delays may be eliminated so that the leading edge may be serviced more quickly.

At power up, microcontroller 116 determines which of these inputs (MAG INPUT/OR PTS1) has the trigger signal and selects only that input for the ignition trigger input. Microcontroller 116 makes the other input an output so that the non-input signal is ignored and cannot interfere with the input signal used. Therefore, microcontroller 116 operates with only one trigger interrupt. The other inputs, such as STEP RETARD's and REV LIMITER, are scanned in between ignition output cycles.

The MAG PICKUP INPUT circuit 420 is also based on a bipolar op amp, such as the MC33072, voltage comparator 422. The use of an op amp like the MC33072 has several advantages over CMOS type and bipolar type comparators like the LM393. Voltage comparators have extremely high gain which make them inherently subject to bounce from noise. Furthermore, CMOS voltage comparators can experience lock up due to high Dv/Dt noise on the supply pins or input pins whereas the MC33072 bipolar op amp is immune to high Dv/Dt noise on the ground and supply input pins.

MAG PICKUP INPUT circuit 420 includes resistors 424–442, diodes 444–450, capacitors 452–458 and the one half of voltage comparator 422. The input is normally connected to a magnetic pickup, such as found on an MSD, Ford or GM ignition distributor. The pickup signal is a near sinusoidal type that has very low amplitude at engine cranking speeds and very high amplitudes at maximum engine speeds. The desired switching point is near the zero crossing of the mag input signal and must be compensated to null the inductive retarding effects of the magnetic pickup. This circuit is designed to perform all of these functions while being very sensitive to input at cranking speeds with +/−0.6 volt minimum input and switch point compensated for high speed and high amplitude, triggering up to 30 volts before zero crossing to null the pickup retard. By proper compensation, the noise immunity is also increased as the mag signal gains amplitude. In particular, as further described below, a feedback circuit is included for automatically enabling noise rejection at the mag input at increasing speeds. The input must also be protected from overdrive due to the large pickup voltage potential at high speeds. The mag input circuit can be easily modified for almost any type of magnetic pickup available by changing a single resistor and the compensation value can be set to give zero degree retard or advance at maximum speed.

Components of the feedback circuit include capacitor 454, resistors 460 and 462, and diodes 448 and 450. Capacitor 454 provides a predetermined time constant via resistor 428 and is discharged via resistor 462 which is in series with diode 450 when pin 22 of microcontroller 116 goes low. Pin 22 goes low after detecting the mag input leading edge signal present at pin 27 of microcontroller 116. Accordingly, the feedback function clamps the negative input of the voltage comparator, pin 6 of voltage comparator 422, to a low voltage value typically 0.7–0.9 volt above ground and discharges capacitor 454 to the lower level as well. The input pin is quickly lowered to the lower voltage level and the capacitor 454 is clamped to this lower level after about 22 milliseconds. This allows the common mode voltage to reach the greatest difference in potential across the voltage comparator inputs, limited to approximately 0.7 volt by diodes 444 and 446. While pin 22 of microcontroller 116 is low, this difference is even greater because the voltage comparator 422 negative input is clamped closer to ground via diode 448 and resistor 460. The microcontroller 116 pin 22 stays low typically for 20 to 30 crankshaft degrees. When this pin goes high the feedback is removed from the voltage comparator 422 and the capacitor 454 begins charging back to its higher voltage level of typically 1.5 volts. At low engine speeds this capacitor reaches near its full potential and the common voltage across the comparator 422 inputs is very close, typically about 80 to 100 millivolts. This keeps the start up sensitivity of the mag input circuit 420 correct for very low peak to peak mag input levels, but as the speed increases, capacitor 454 never reaches the full charge potential and thus develops a larger difference voltage across the inputs of the voltage comparator 422 which increases the noise immunity of the mag input circuit 420 further as the speed increases. This automatically provides a self-compensating means of rejecting noise at the mag input which increases the ability to reject higher noise levels as the engine speed increases.

Pin 6 of microcontroller 116 is clamped by back-to-back diodes 444 and 446 for +/−0.7 volts maximum differential and the input pins 5 and 6 are offset from ground at about 1.56 volts at pin 6, the inverting input. The non-inverting input is biased at about 1.64 volts so that there exists an off-state voltage difference of about 80 millivolts across the voltage comparator 422 inputs. The voltage comparator 422 will have an output of high, near 5 volts, in this state. The series resistor string of 432 and 434 are paralleled by resistor 428 to bias the inverting input pin 6 at resistor 426 to about 1.56 volts. Also, the pickup winding parallels resistors 426 and 432. By biasing the inputs above ground by about 1.5 volts, the voltage comparator 422 input is never pulled below ground and still allows the voltage comparator 422 to be powered from only a 5 volt supply.

The mag input circuit 420 includes capacitor 456, diode 450 and resistor 442, supply slope compensation to the input. Capacitor 456 will shunt resistor 438 via diode 450 on the positive slope of the mag signal input. This provides a higher gain on the positive going portion of the mag input signal which counters the retard of the mag signal; however, the same gain is not desirable for the negative going portion of the input signal. Diode 450 blocks the negative and decreases the gain by having resistor 442 in series with capacitor 456. This allows the negative slope compensation to be about ¼ of the positive slope compensation and prevents over-driving of the comparator 422 inputs which may be caused by extreme rates of negative mag input signal or noise on the mag input signal. A wire loop is provided between the negative mag input and capacitor 466 and resistor 468 to select the optimum mag compensation. In particular, the wire loop may be cut to comply with requirements of various manufacturers.

The microcontroller 116 output IGN/TRIG is the ignition output drive signal that is level shifted to drive IGBT pair 219, the ignition coil 32 IGBT switch. According to one form, this output was approximately 105 microseconds in duration to drive IGBT pair 219. This value was chosen because the inductance of large inductive ignition coil 32 limits the current rise time and at least 80–90 microseconds are needed to completely discharge the fully charged capacitor bank 154 and 156 into the ignition coil 32 primary.

The multispark period is controlled by the microcontroller 116 and is normally about 975 microseconds at battery input 132 above 12 volts. The multispark period is increased if the capacitor bank 154 and 156 has not reached full charge in 975 microseconds and can be delayed up to a maximum of 1.8 milliseconds if needed. This provides full amplitude (525–535 volts) of every spark output until the battery drops below 10 volts when the 1.8 milliseconds limit is reached.

The CONV INH is used to shut the convertor off while IGBT pair 219 is turned on. These signals overlap such that the convertor can be ready for output within microseconds of the IGN/TRIG signal going low. This improves the time between capacitor discharge and recharge so that very little time is wasted.

The individual cylinder retard timing feature (CYL DEG) requires an input signal from the CAM PICKUP circuit 470. This circuit also uses a voltage comparator 472 such as a MC33072 op amp. The input is either connected to an inductive fiber optic spark sensor 22 or a conventional magnetic inductance coil 28. The CAM PICKUP input circuit 470 includes resistors 474–486, diodes 488 and 490, capacitors 492–498 and voltage comparator 472. Resistor 484 provides the pull-up current source and is directed to voltage comparator 472 pin 2 and clamped by back-to-back diodes 488 and 490. The input from the fiber optic sensor 22 is directed to pin 2 through a transistor 499 such as an IF-D92 available from Industrial Fiber Optics. When transistor 499 detects light from the fiber optic cable from the spark sensor 22, the transistor 499 drives pin 2 to low and capacitor 494 quickly discharges driving pin 2 lower than pin 3 to switch the output of pin 1 high. The optical fiber input to the spark sensor 22 must be covered when not in use or when the cam sensor 28 to prevent the detection of light and thereby producing an input signal to pin 2 of comparator 472.

Turning to the outputs of the electronic controller 10, one output is the RPM activated switch. As seen on FIG. 6D, the RPM SW 500 consists of a power MOSFET switch 502 and resistor 506. When the engine RPM reach the programmed RPM SW "on" value stored in non-volatile memory 118, power MOSFET 502 receives a positive signal through resistor 506. Conversely, when the RPMs reach the RPM SW "off" value, microcontroller 116 removes the signal bring the voltage to ground thereby removing the power to MOSFET 502. The RPM SW 500 output has 100 RPM of hysteresis to prevent the switch or solenoids connected to the output from chattering at turn-on and turn-off. This RPM SW 500 may be used to control any desired RPM on-off switch such as a nitrous supply or a solenoid used to shift a two speed transmission.

SHIFT LIGHT OUT 508 is controlled by microcontroller 116 through MOSFET 510. When the engine RPMs reach the programmed values stored in non-volatile memory 118, microcontroller 116 sends a signal to MOSFET 510 thereby bringing the SHIFT LIGHT OUT 508 to high. This output 508 may be connected to a shift light which, as controlled by the electronic controller 10, illuminates at stored RPM values and indicates when the driver should manually shift the transmission. Also, the output may be connected directly to an automatic transmission shift controller which will activate as when SHIFT LIGHT OUT 508 signal goes high. During operation the LAUNCH REV LIM wire resets the SHIFT LIGHT sequence to the programmed first gear RPM shift value. When the LAUNCH REV LIM input is removed from +12 volts, the SHIFT LIGHT will use the first RPM value stored to turn the SHIFT LIGHT OUT 508 on (high) after a 750 microsecond delay from the LAUNCH REV LIM wire going low for a six gear transmission. For transmissions with less than six gears, microcontroller 116 automatically adds 100 microseconds to the delay for a five speed transmission, 200 microseconds for a four speed for transmissions as so forth. This delay prevents false shifting to the next stored shift RPM value. For each gear after the first shift, the next shift is delayed by 300 microseconds. Microcontroller 116 detects a shift after a rise and then a fall in engine RPM of at least 500 RPM or the user may program this RPM drop to ensure peak efficiency (see gear shift menu on FIG. 3). After the engine RPM has increased by at least 200 RPM above the lowest actual engine RPM drop, the next programmed gear shift value is selected to bring SHIFT LIGHT OUT 508 to high. Once the SHIFT LIGHT OUT is on, the output stays on until the RPM drops by 100 RPM below the programmed gear shift value.

The SHIFT LIGHT OUT 508 also provides the activation signal for the GEAR SHIFT RETARD functions. The user may program an ignition timing retard for each gear shift. For example, the user may program a 5 degree ignition timing retard to activate at the first gear shift, a 2 degree at the second gear shift and a 3 degree at the third gear shift. Each ignition timing retard will be added such that at the second gear shift the total ignition timing retard is 5 degrees+2 degrees=7 degrees and at the third shift, 7 degrees+3 degrees=10 degrees. These gear shift ignition timing retards allow the user to select additional timing retard to increase the total timing retard as each gear is shifted without the need for extra transmission micro-switches to the gear shift mechanism. Thus, the problems and failures associated with those micro-switches are eliminated.

The LED 512 output is used for several modes of operation. The first is used to turn the LED 512 on (output low) when the PTS1 signal goes high (trigger edge) to indicate static timing or points signal present. Also, when the mag signal is present, the LED 512 will blink, indicating that the mag signal is present and OK. The LED blinks a code "22" rate when the capacitor bank 154 and 156 is taking longer than the normal, 975 micro-seconds, to recharge during multispark operation. Further, LED 512 blinks a code "11" to indicate that no CamSync signal is present. The hand-held programmer 6 and computer 8 also display equivalent warnings as the LED 512 by indicating under the MONITOR 61 indicia at the top of the menu tree 60. When the electronic controller 10 senses a low voltage battery condition, the hand-held programmer 6 and computer 8 will display "Low Batt LOW" and "CamSync NONE" to indicate that there no CamSync signal present and "OK" to confirm that the signal was found.

The TACH output 514 drives the gate of MOSFET 517 which provides a signal of 30 to 45 degrees duration with a 12 volt (battery) amplitude at the TACH output 514 terminal pulled up by resistor 516. This output may be used by external devices such as RPM activated switches and for a tachometer drive signal. The TACH output 514 terminal is protected against shorts to the battery by the self-resetting polyfuse 518.

When the engine is running, the electronic controller 10 signal from the cam sensor 28 or spark sensor 22 for 8 to 16 revolutions before verifying the signal to ensure that the actual signal is sensed in lieu of noise. The electronic controller 10 stores a history of the signal as a reference to distinguish for noise. Next, the electronic controller 10 determines whether the cam sensor 28 and magnetic crank trigger sensor 18 signals are present and properly phased as indicated on the MONITOR function 61. If the signals are not properly phased, the cam sensor 28 may be adjusted by moving the cam sensor 28 until the display on the hand-held programmer 6 or the computer 8 changes from "CamSync OK" to "CamSync NONE", marking the position and moving the cam sensor 28 in the opposite direction and monitoring the display for the position where the CamSync readout changes from "OK" to "NONE" again and marking the position. The proper position for the cam sensor 28 is the half-way point between the marked lines. Once the cam sensor 28 is phased, individual cylinder timing may be adjusted. The phasing of the cam sensor 28 and magnetic crank trigger sensor 18 is not needed when using the spark sensor 22.

If a cam sensor 28 or spark sensor 22 is not detected, the electronic controller 10 recalls the programmed, individual timing retards of all cylinders, selects the maximum retard value programmed for a cylinder and applies that value to all cylinders. This acts as a safeguard to maintain a timing retard and prevent misfiring. This condition is also displayed on the computer 8 on the individual cylinder timing bar graph 72. The bar of the selected maximum retard will remain its initial color, green, and the remainder of the bars will match the maximum value and change to red. This quickly notifies the user that the of the ignition timing retard being applied to all cylinders. Furthermore, if the signal from either cam sensor 28 or spark sensor 22, is removed during operation of the engine, the electronic controller 10 continues to apply the programmed individual cylinder timing retard values until the engine has stopped running.

Individual cylinder timing may be retarded up to 5 degrees per cylinder in 0.1 degree increments. The cam sensor 28 or spark sensor 22 signals the microcontroller 116 that the first cylinder has fired thereby starting the ignition spark triggering sequence (the next cylinder to fire as dictated by the next post on the distributor cap). Microcontroller 116 will delay the ignition trigger signal to the ignition coil 32 by the degrees of rotation stored in non-volatile memory 118 for that specified cylinder. A delay may be stored for each cylinder. And, as with all of the ignition retards, the individual cylinder retard is additive.

The MagComp (magnetic pickup compensation) feature allows the user to compensate for the inherent ignition timing retard of the magnetic picking to increase timing accuracy from idle to maximum RPM. This feature is adjustable from 0 to 3 degrees of ignition timing in 0.5 degree increments. The default setting stored in the non-volatile memory 118 is 2 degrees. One method the user may use to determine the inherent retard is by monitor the ignition timing of the engine during operation from 0 to maximum RPM with a timing light. By adjusting the MagComp, the user is ensured that all timing values are accurate over the RPM range of the engine.

Figure 6A:
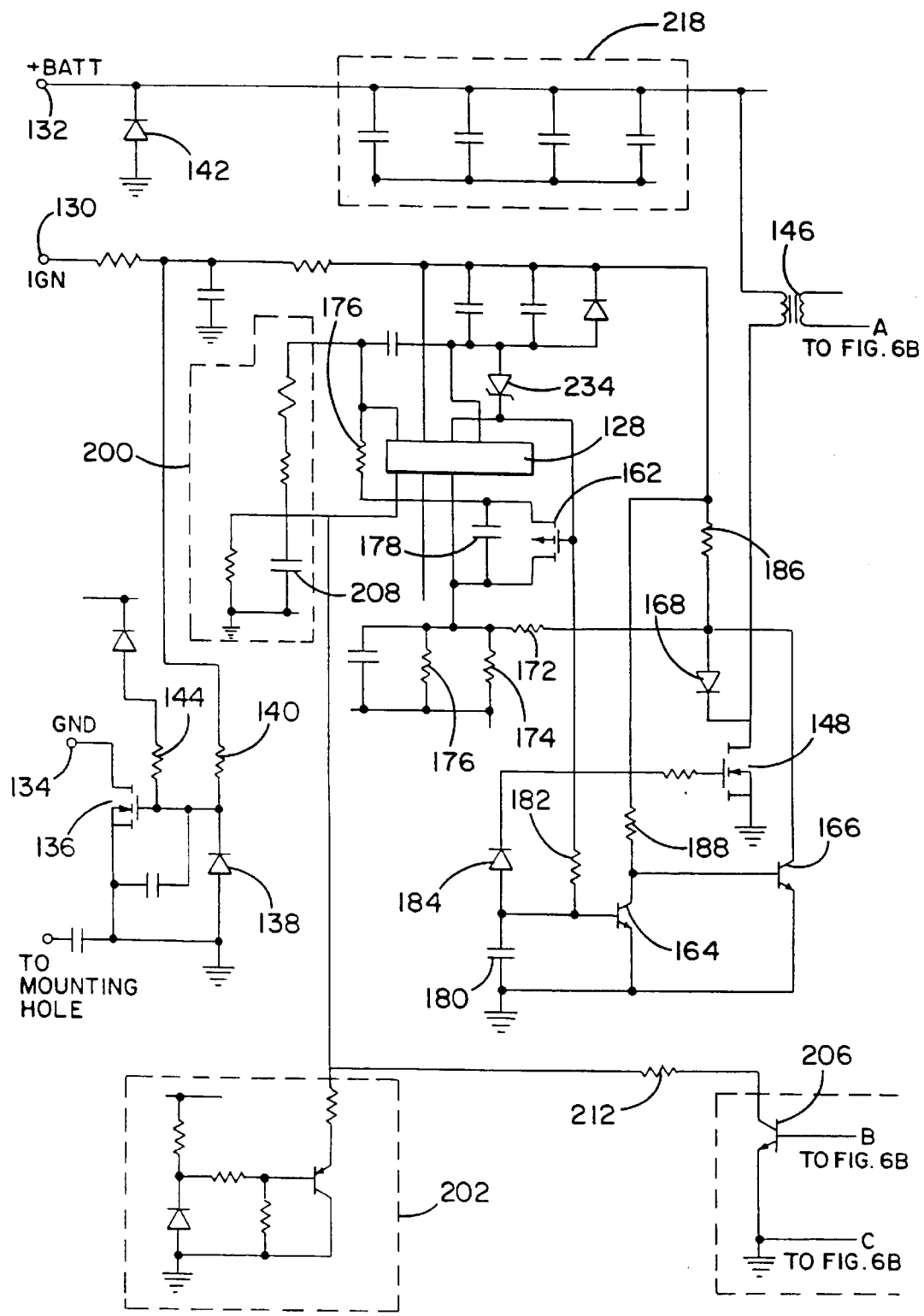
Figure 6B:
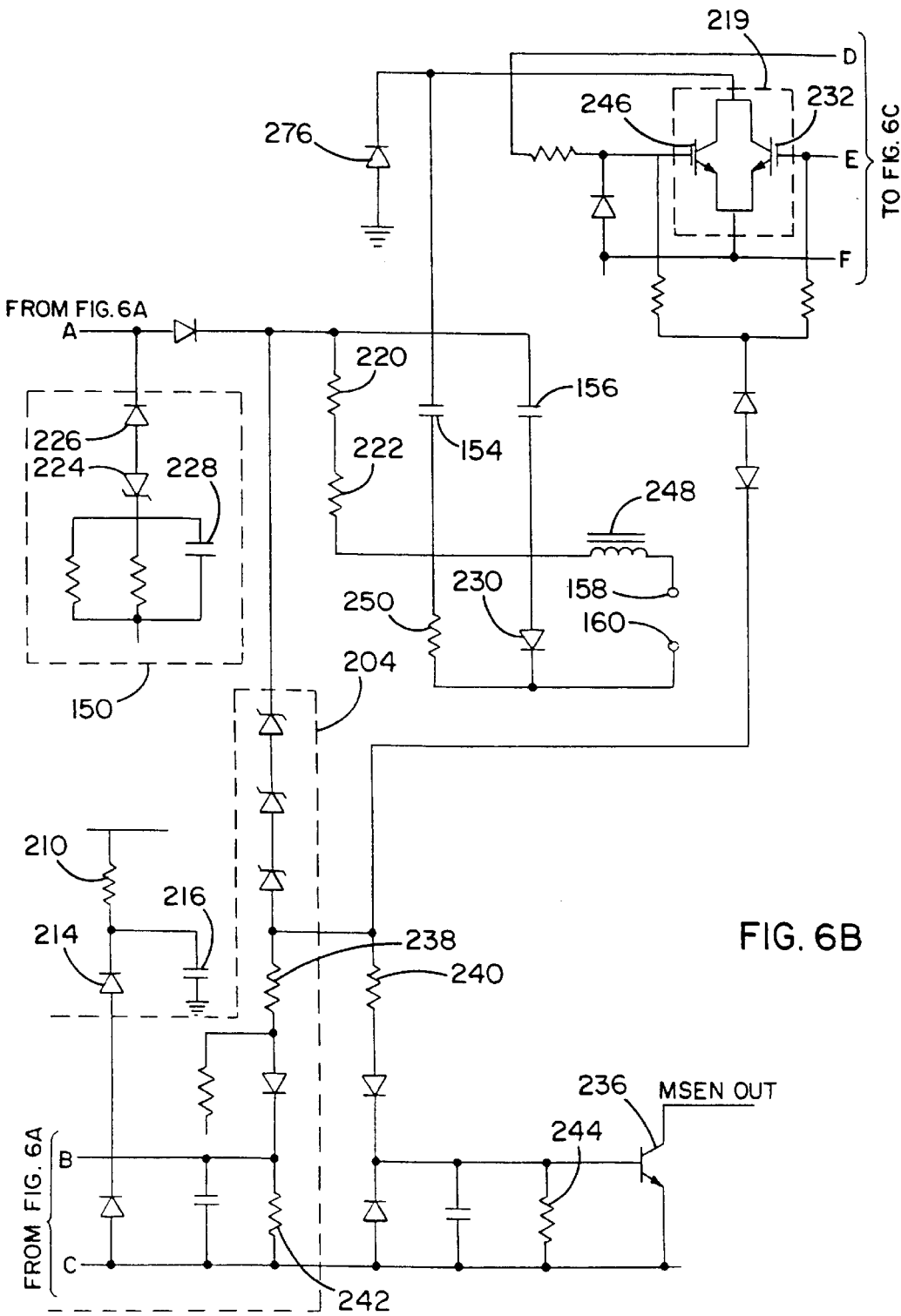
Figure 6C:
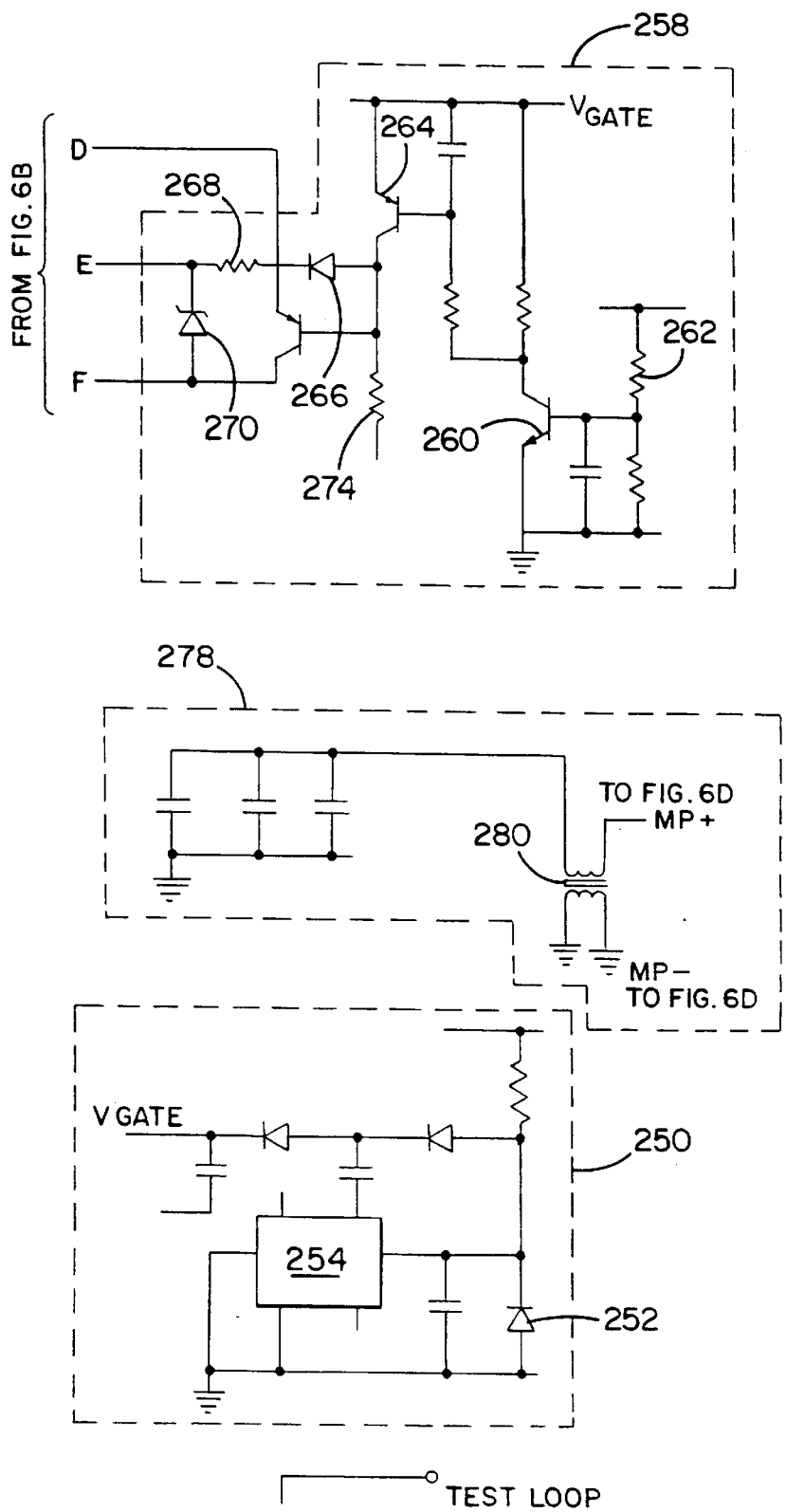
Figure 6E:
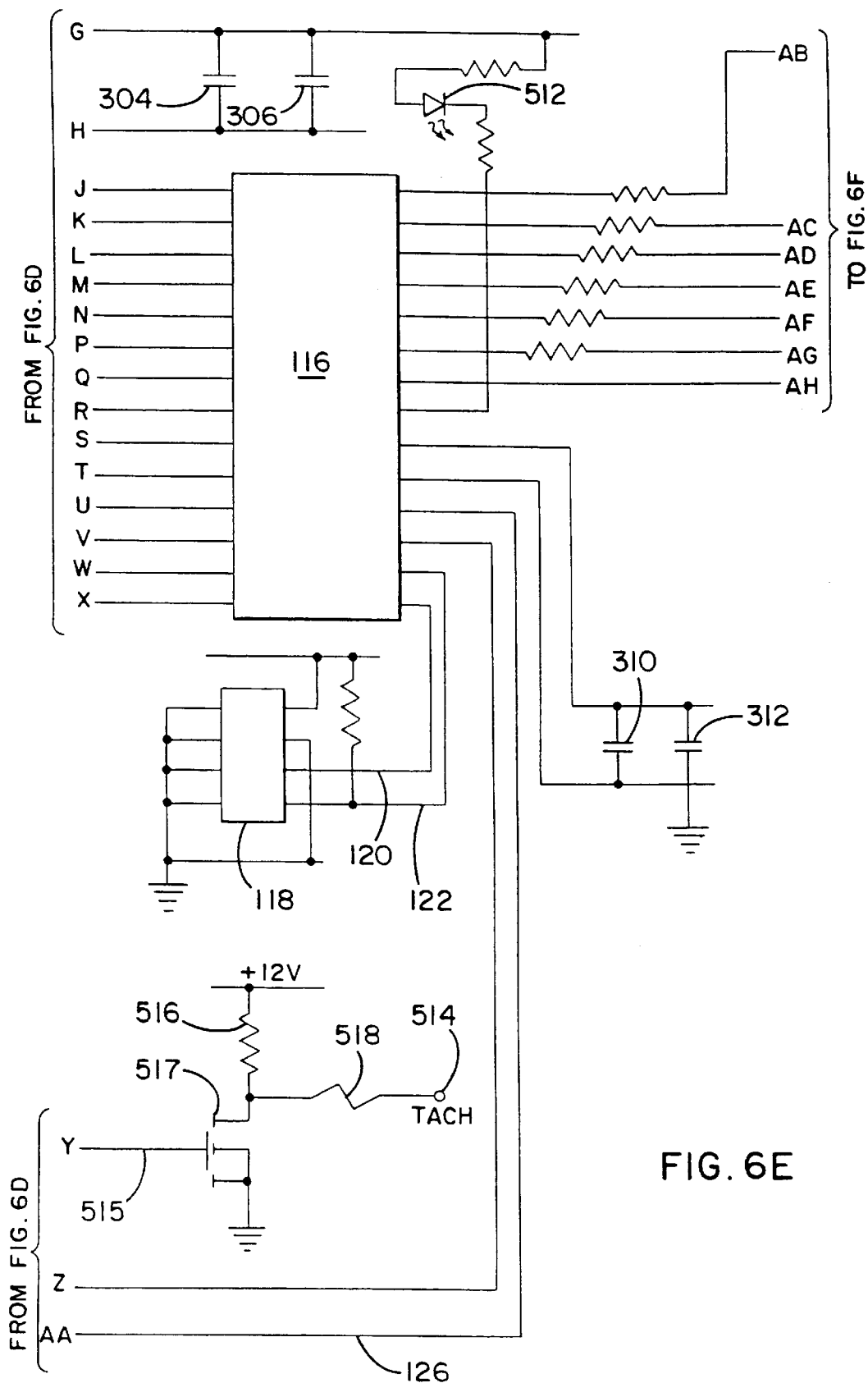
Figure 6F:
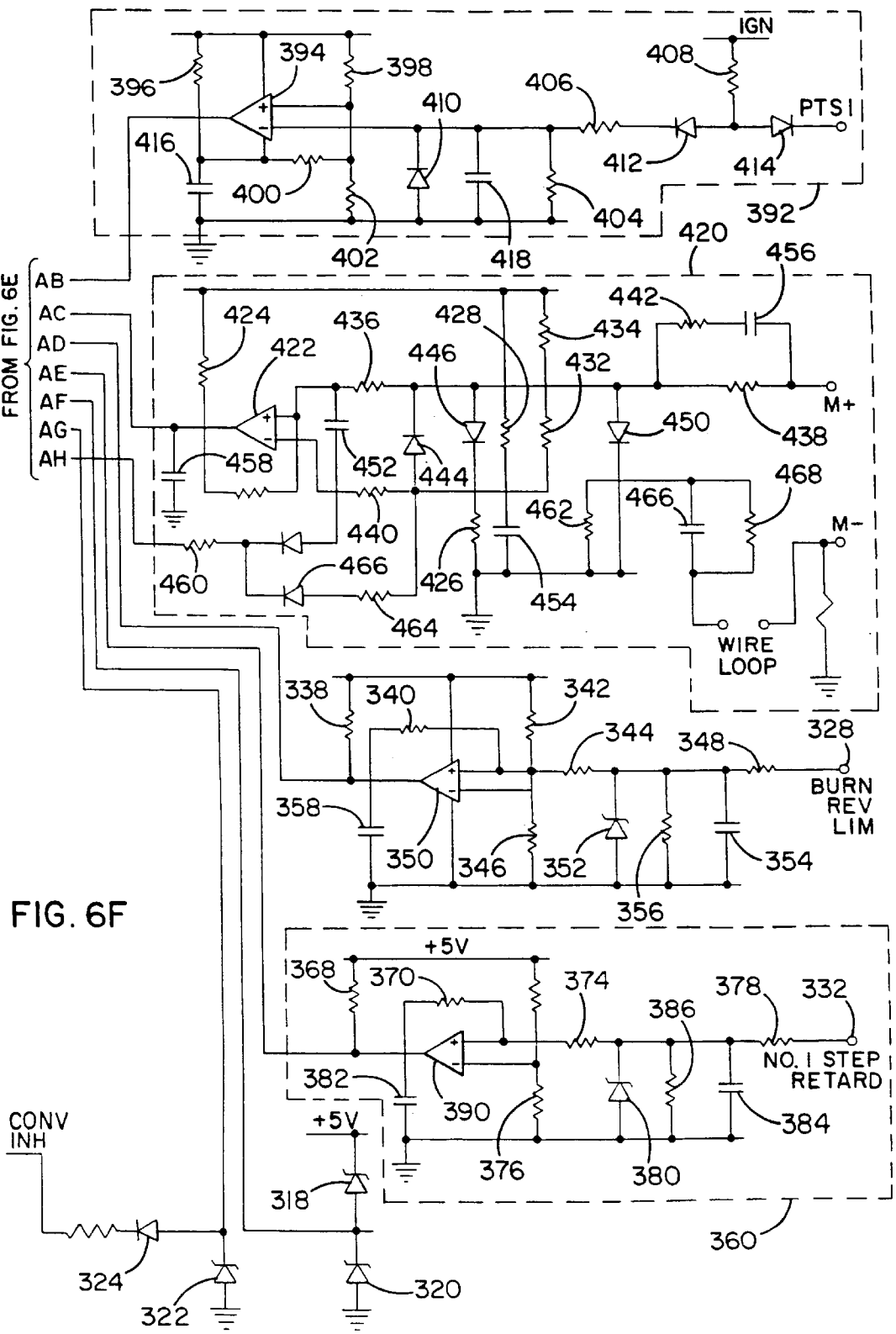
Figure 6G:
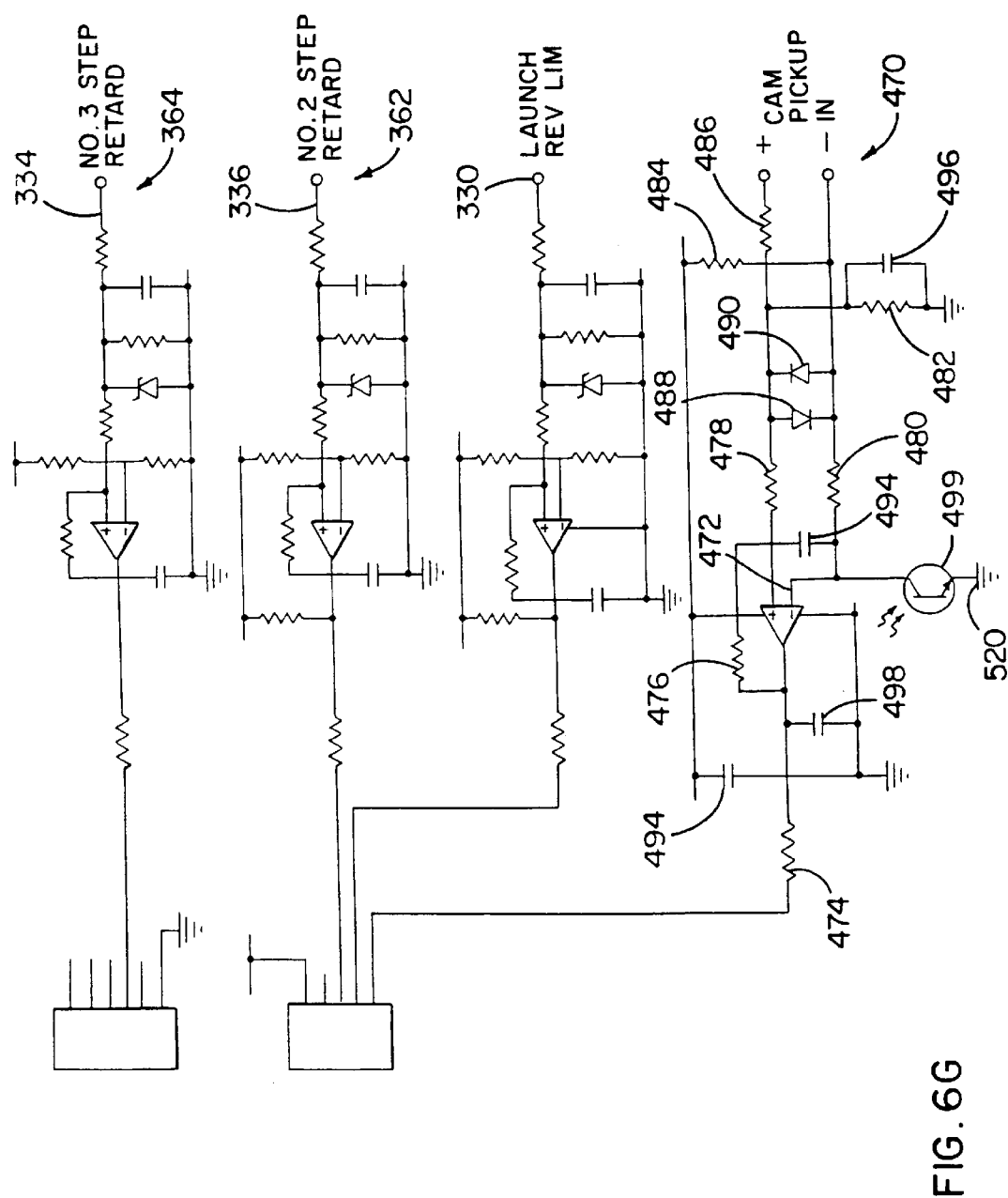
Figure 7:
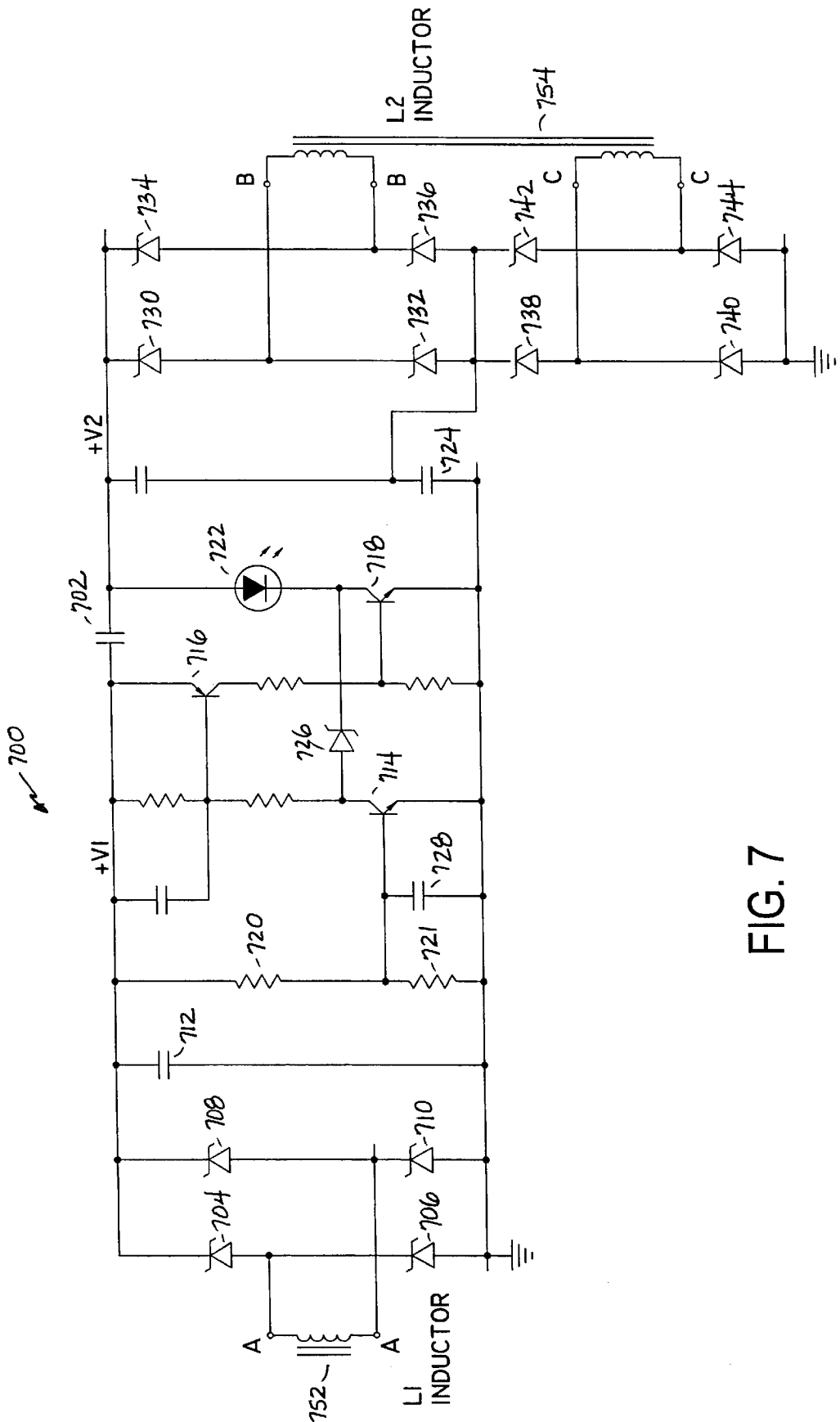
FIG. 7 is a schematic diagram of the circuitry for the electronic spark sensor optimized for higher light emitting diode (LED) current drive providing additional current for the optical timing sensor of the present invention.
Figure 8:
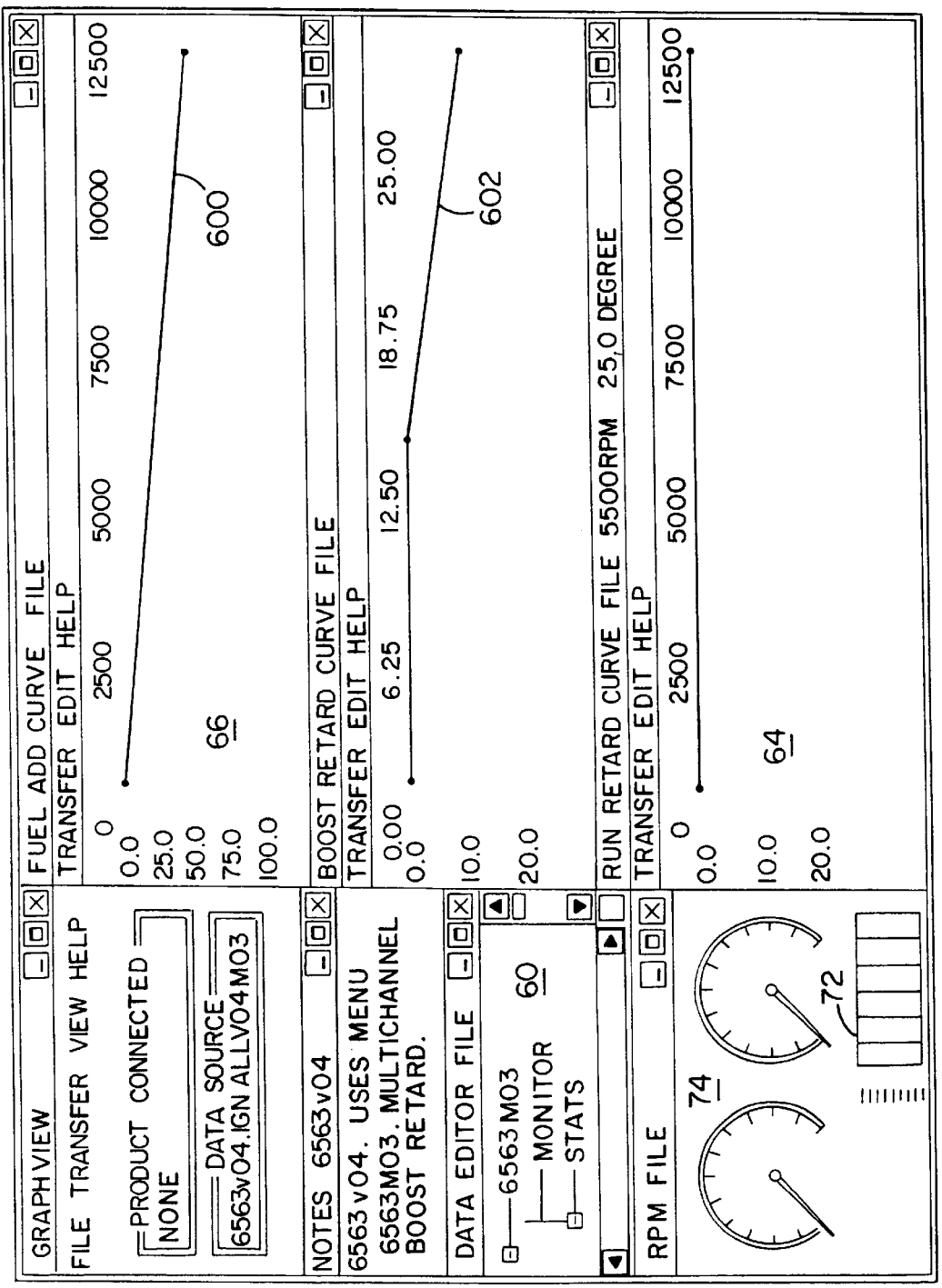
FIG. 8 shows a computer screen for displaying real time data tree and graphical engine operation displays.
Figure 9A:
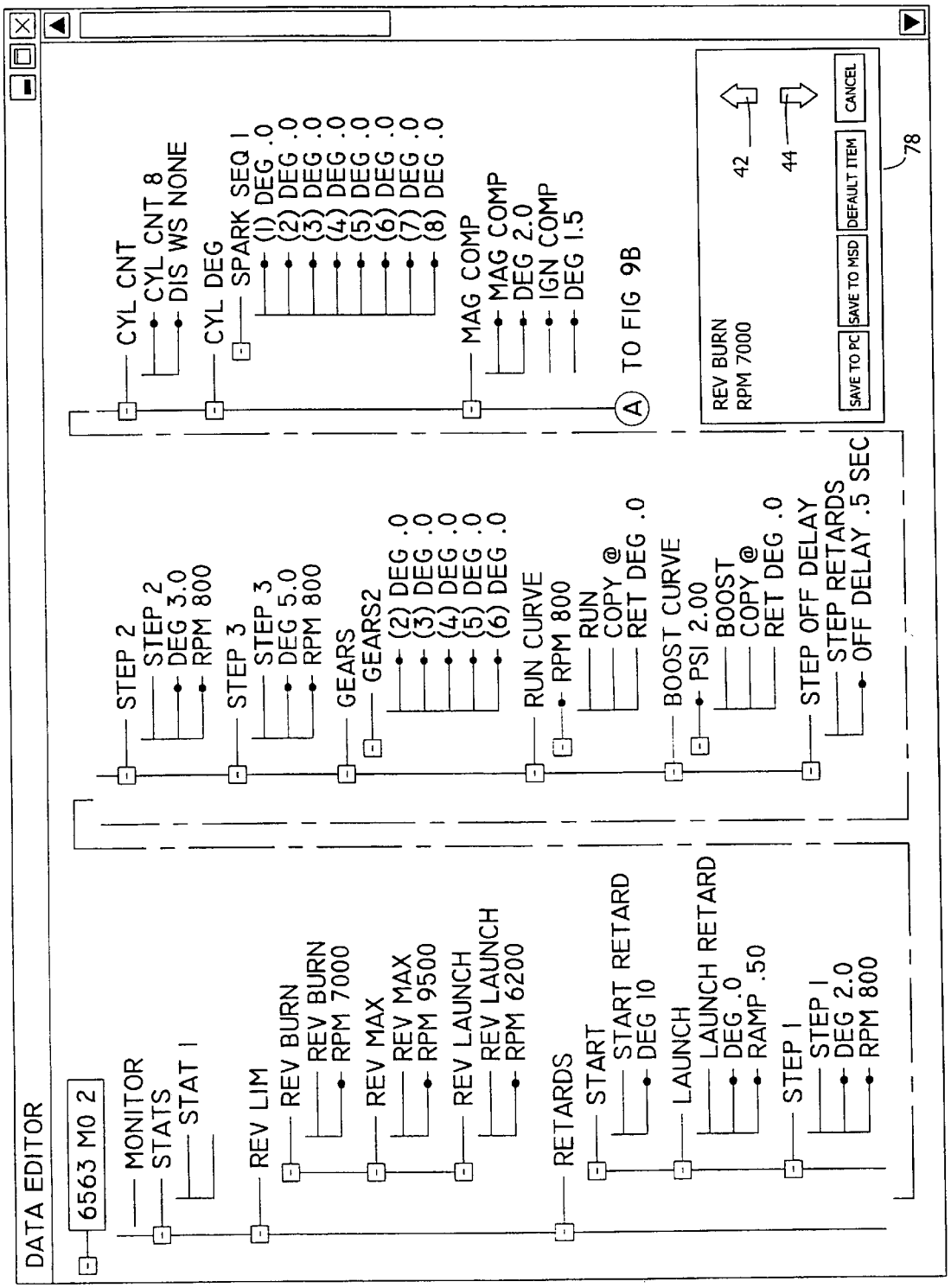
FIGS. 9A and 9B show the extended views of the data editor windows selected from the data tree of FIG. 8.
Figure 9B:
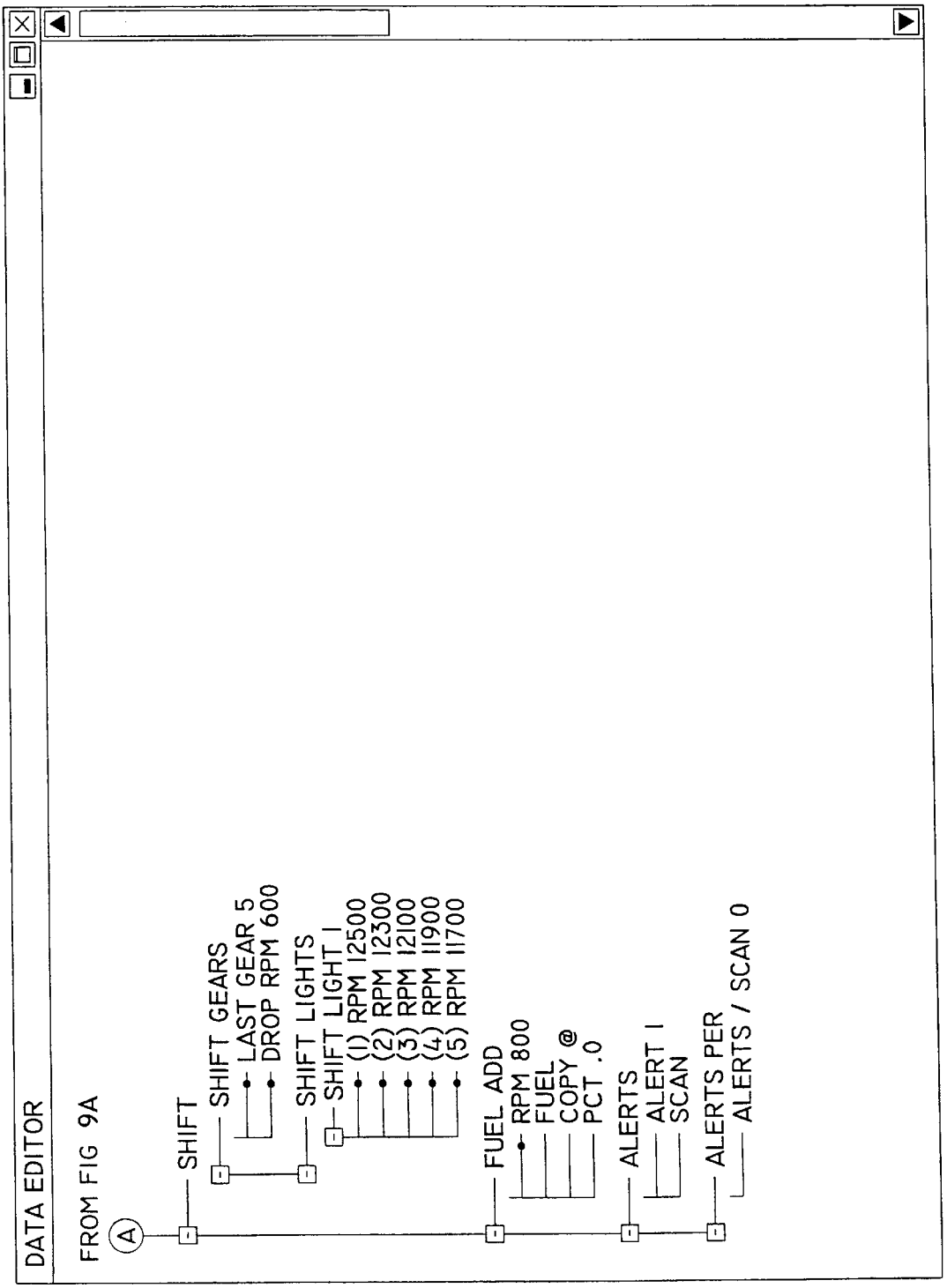
Figure 10A:
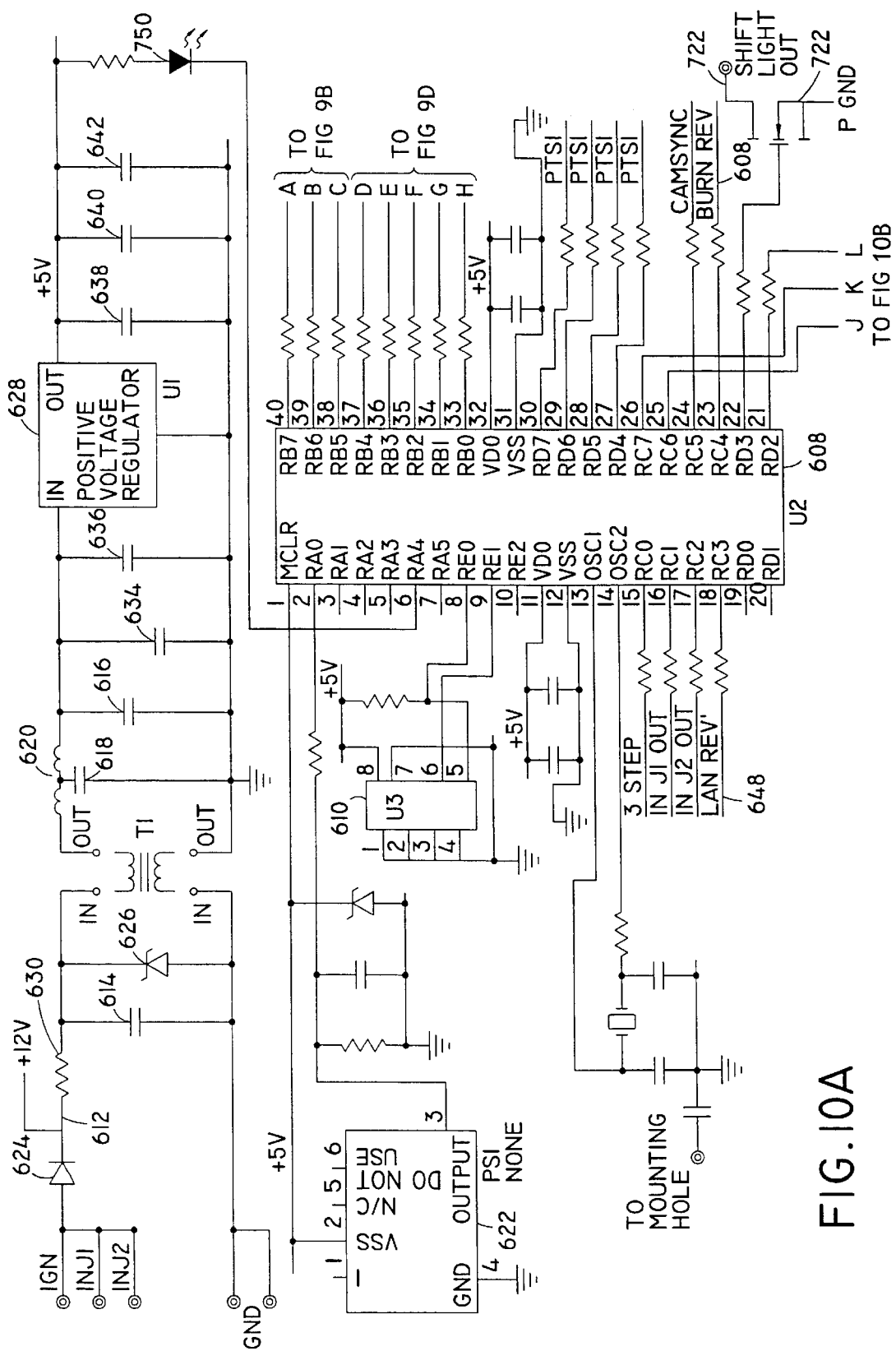
FIGS. 10A and 10B are schematic diagrams for an alternate embodiment electronic controller in accordance with the invention.
Figure 10B:
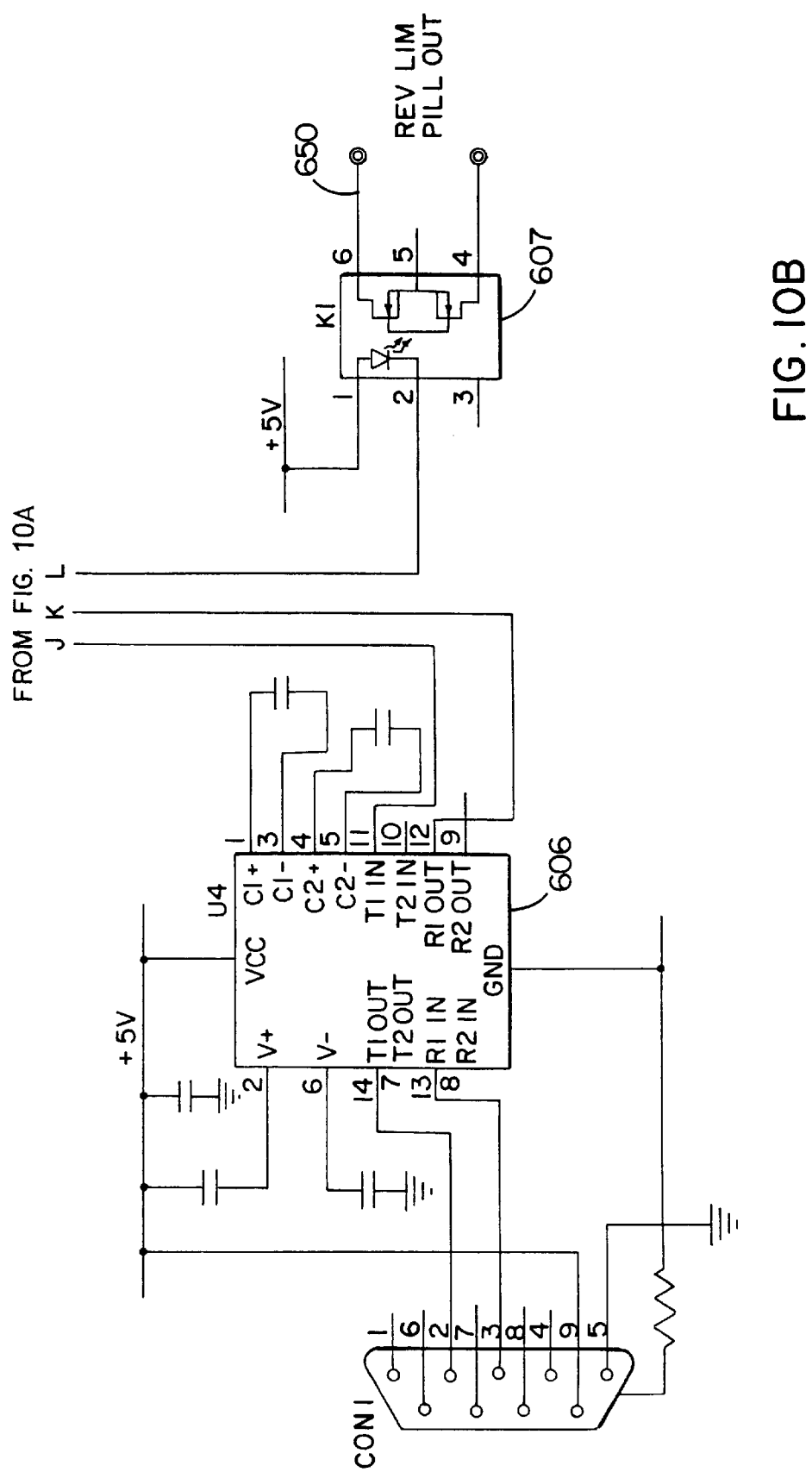
Figure 11:
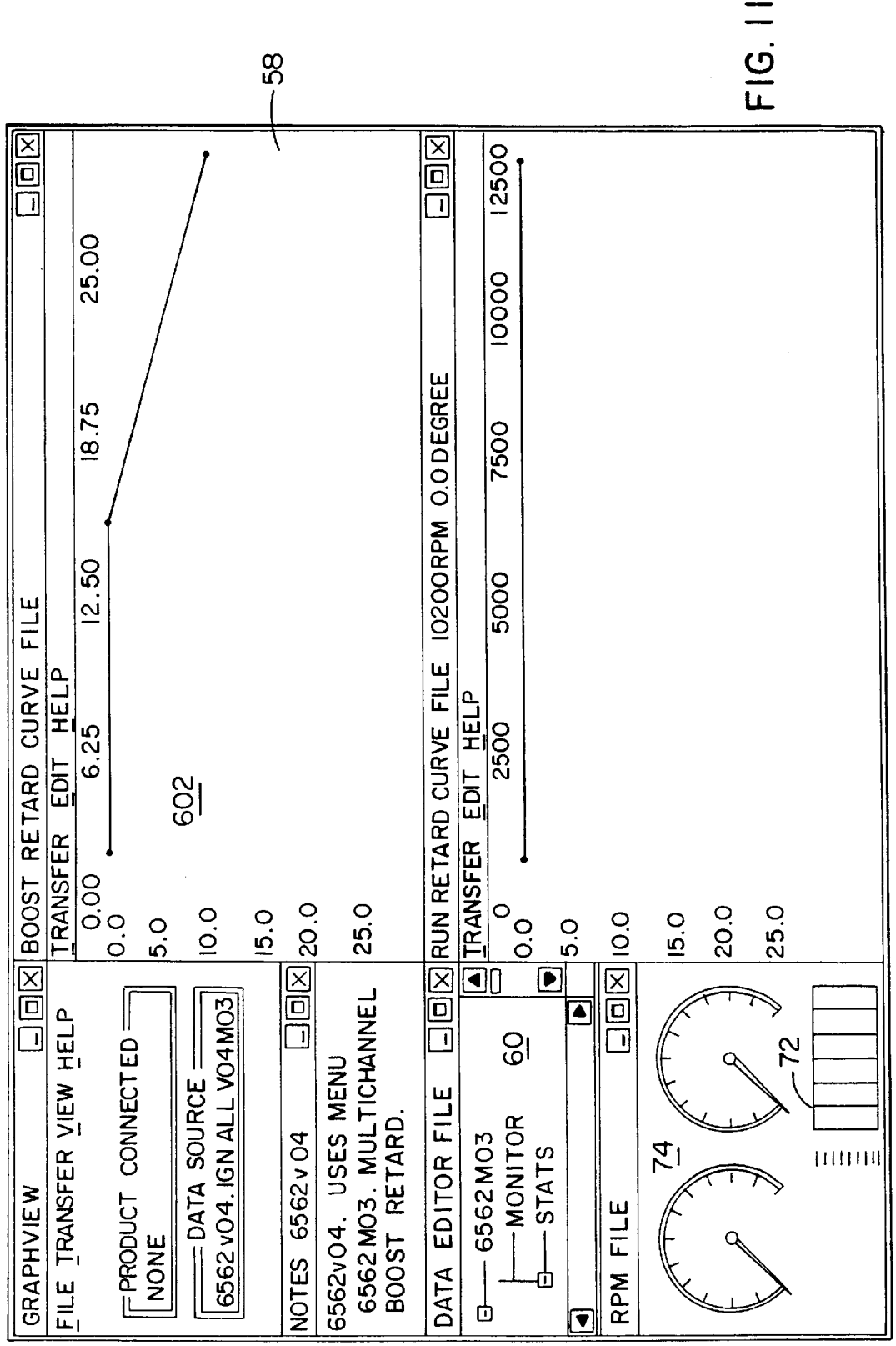
FIG. 11 illustrates the main computer screen of the electronic controller displaying boost retard and engine run timing curves and graphical tachometer in an embodiment which does not require the fuel add curve of FIG. 8.
Figure 12:
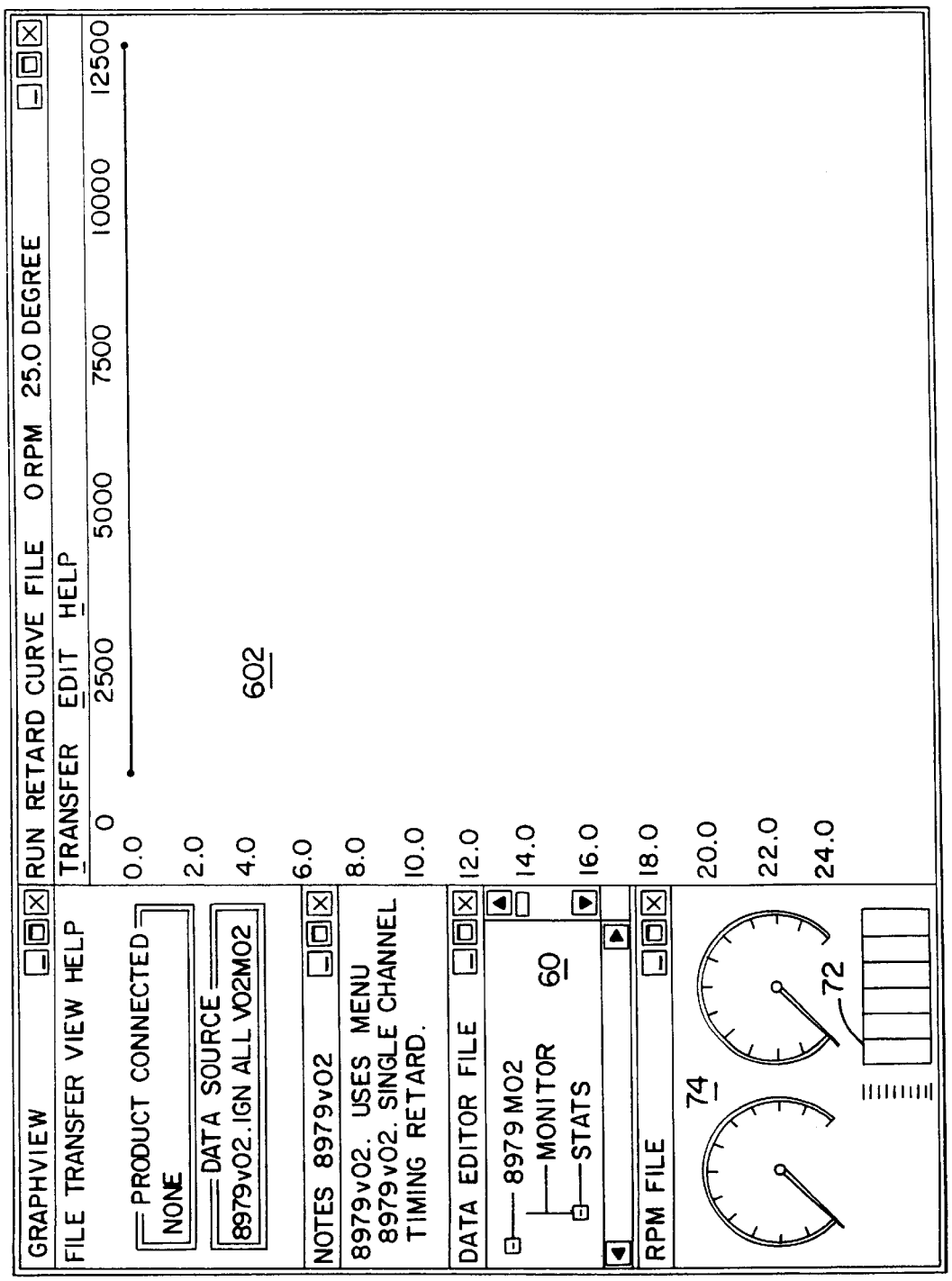
FIG. 12 illustrates the main computer screen of FIG. 11 with an expanded run retard curve selected from the computer display of FIG. 11.
Figure 13A:
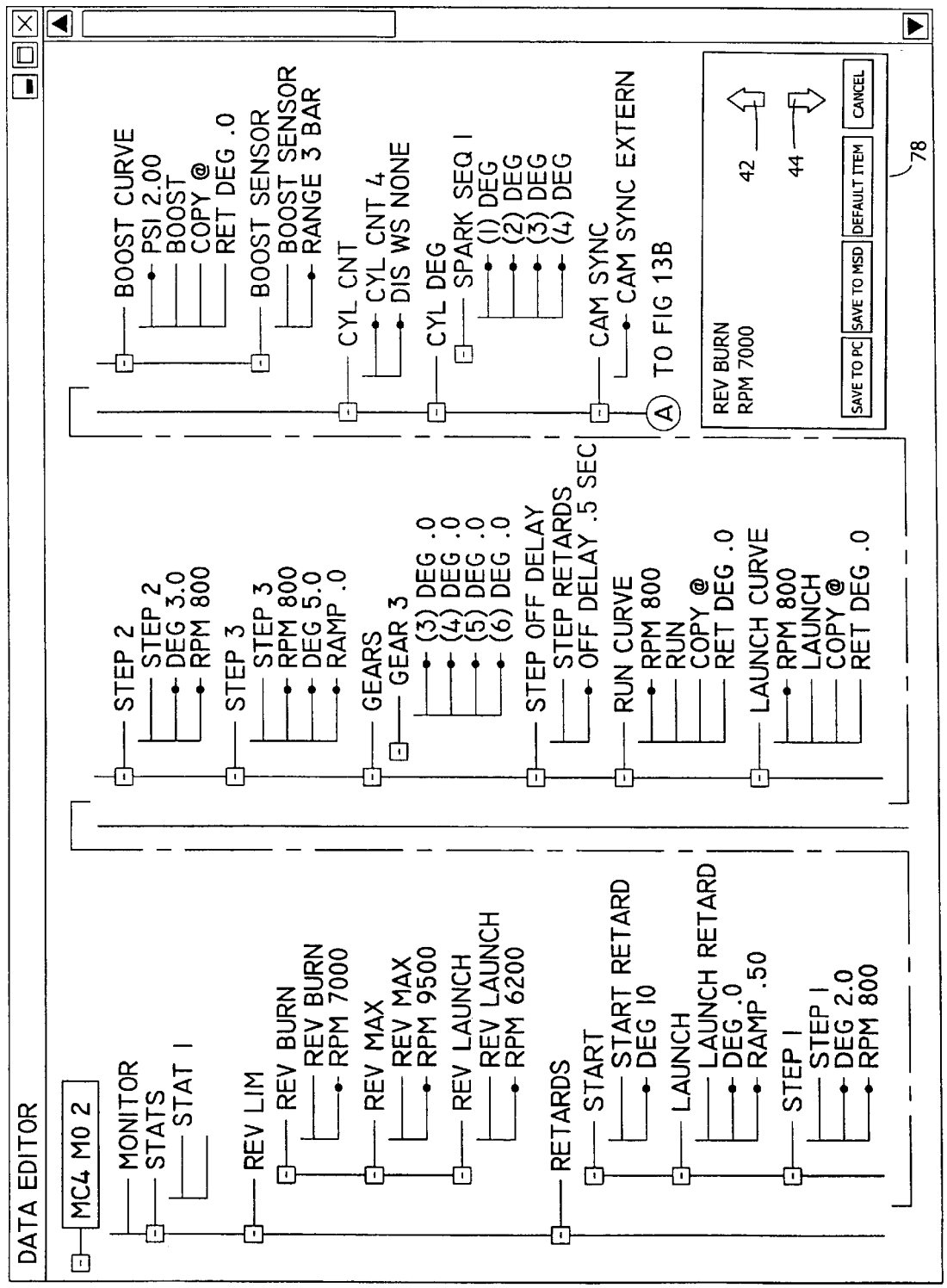
FIGS. 13A and 13B illustrate the expanded data editor window display in accordance with an alternate embodiment of the invention providing for the control of a motorcycle engine.
Figure 13B:
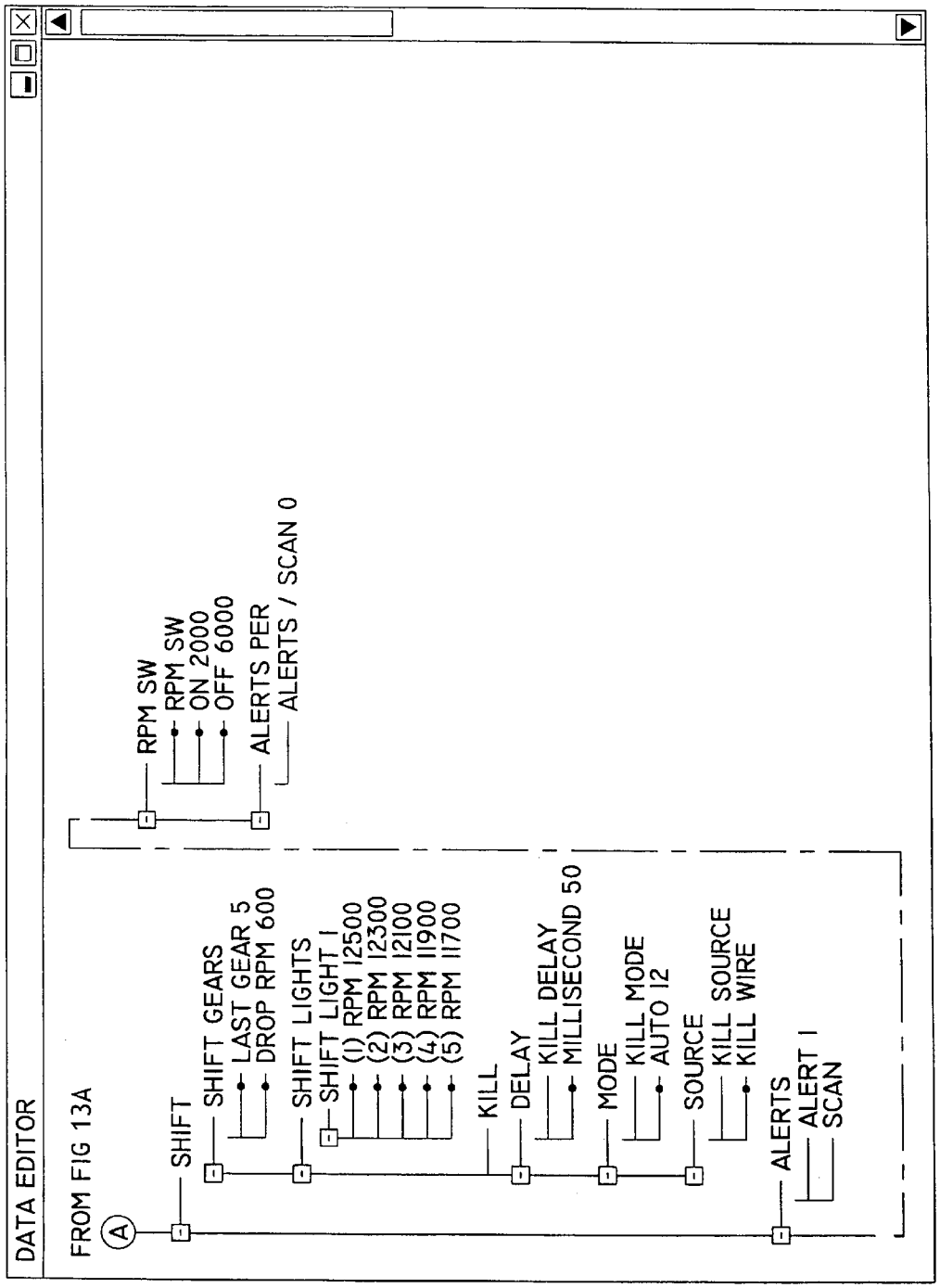

As discussed further below in connection with FIGS. 14–15, first waveform illustrated for the schematic of FIG. 7 shows that voltage stored in pickup capacitors 702 and 724 are discharged as in FIG. 14 in the form of voltage into LED 722 and electronic controller CamSync transistor at op amp input pin (pin 472 of op amp, see FIG. 6G above).

FIG. 7 illustrates the circuitry of one form of an inductive fiber optic spark sensor. The circuit 700 is built around an infrared emitter 722 such as a IF-E91A available from Industrial Fiber Optics. As the ignition coil 32 sends an electrical impulse to the sparkplug wire 24, the inductors 752 (L1) and 754 (L2) sense the increased current and produce a low voltage current signal. Capacitor 702 stores the current to increase the drive current to infrared emitter 722. A fiber optic cable (not shown) sends the resulting light emission from infrared emitter 722 to the CAM PICKUP circuit 470, discussed above.

Figure 15:
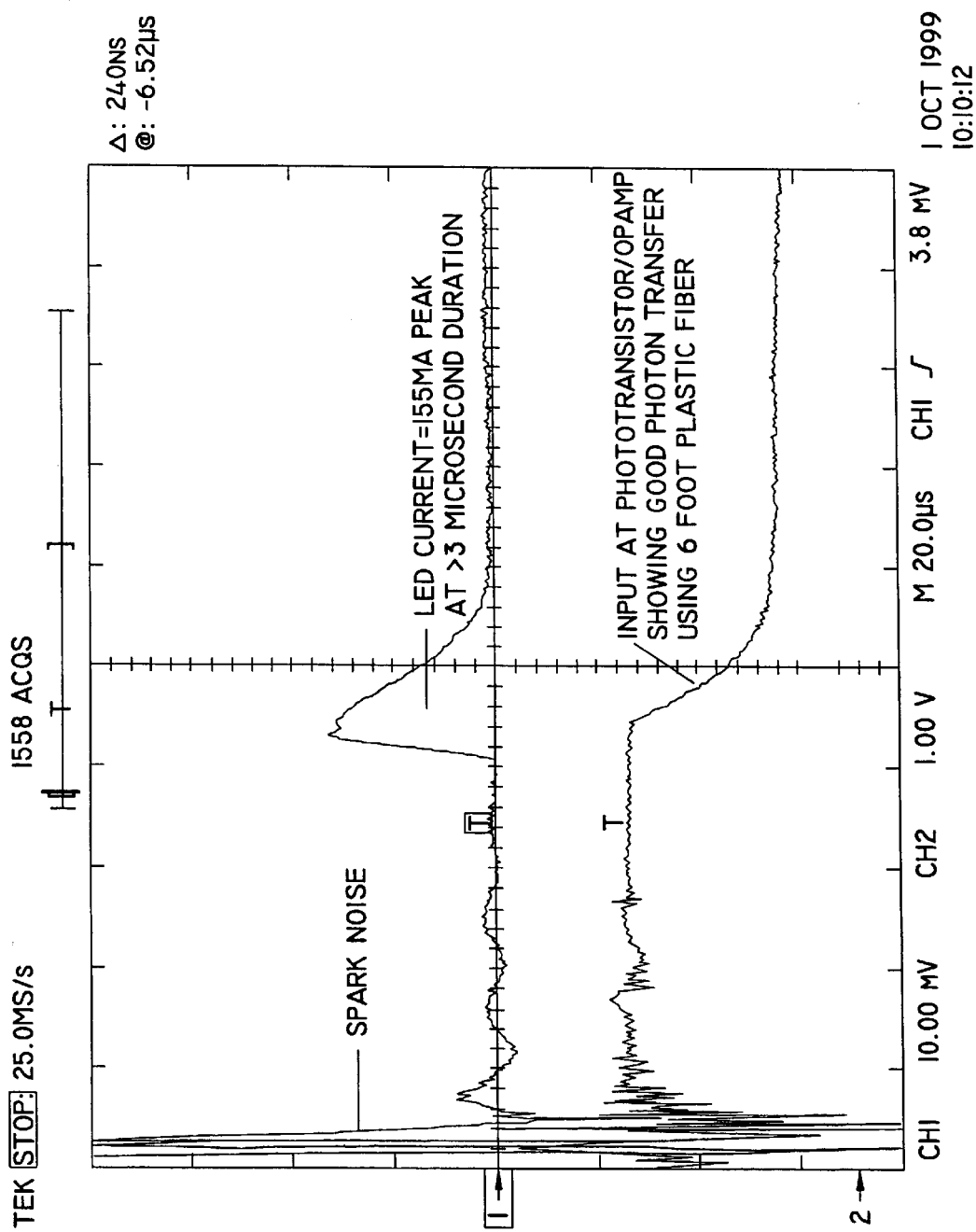
FIG. 15 shows a waveform illustrating the initial current flow across the spark plug gap with a small delay for voltage storage in the pickup capacitors.

In FIG. 15, a second waveform shows the event of a current beginning flow across plug gap small delay to store voltage in 702 and 724, when then provides a high current discharge/short duration into LED 722 which transmits a signal to the fiber optic transistor receiver (i.e., response of phototransistor relative to LED current flow).

With reference to FIG. 7, the inductive/spark pickup with fiber optic output is used to indicate when an ignition event has taken place, indicating current flow at the spark plug gap or the input to an ignition coil primary.

A fiber optic cam sync input circuit 700 is shown in FIG. 7. When used on the spark plug wire, the current flow through the plug wire induces a current flow in inductor L1 and L2 (752 and 754). These inductors are of a toroid design and fully encapsulated to protect the circuitry from high voltage corona fields around the plug wire. There are no wires connecting any of the pickup circuitry to any external circuits beyond the pickup, as this would create a noise path for corrupting the pickup signal or device that was in this path. The only external connection is a plastic optical fiber, typically 8-foot to 16-foot in length between the fiber optic LED 722 with pickup to the fiber optic phototransistor in the electronic controller. The output signal from the spark pickup is used for a CamSync signal indicator or reference signal in the electronic controller to time the first cylinder ignition event to allow individual cylinder timing to be used.

The pickup circuit consists of inductor L1, L2 which allow power to be quickly extracted from the current flowing through the wire which runs through the hole in the toroid shaped inductors. This energy is quickly stored in a capacitor arrangement to be later discharged across the fiber optic LED 722. Also, the circuit consists of rectifying the L1, L2 voltage for DC applied to the circuit, using low forward drop Schottky diodes in a full bridge arrangement allowing negative or positive current flow in the plug wire.

The circuit 700 also has a delay section to hold off triggering the LED 722 current for a specific time to allow sufficient stored energy to result in a large current pulse in the LED 722 at discharge. Voltage stored in pickup capacitors 702 and 724 is discharged into LED 722 and electronic controller cam sync phototransistor at op amp input pin (pin 472 of op amp, FIG. 6G).

Inductor L1-A-A winding is the trigger winding for applying energy to both drive the LED transistor discharge circuit as well as supplying energy to the LED 722 at discharge via capacitor 702. As the current flows at plug gap/plug wire, the voltage induced in L1-A-A winding is diode rectified via diodes 704, 706, 708, and 710 and applied to capacitor 712, snubbed, and energy storage for transistor 716 base drive to transistor 718 discharge transistor. The voltage +V1 rises as capacitor 712 and capacitor 702 charge until enough voltage builds to bias resistor 720 to capacitor 728 which sets the delay time to turn transistor 714 ON. This is typically about 8 ps from plug current flow until transistor 714 base rises to 0.6–0.7 V to turn on transistor 714. At the time transistor 714 is biased ON, transistor 716 is pulled low to forward bias transistor 716 ON, this results in transistor 716 biasing transistor 718 ON which then discharges capacitor 702, and capacitor 724 through LED 722. The result of transistor 718 turn on also provides a latching function via diode 726 which holds transistor 716 biased ON to keep transistor 718 base biased ON until voltage +V1 falls below the level to keep transistor 716 ON. Transistor 718 then turns off when +V1 drops below about 2.1 V. Also resistor 721 now fully discharges the capacitor 728 on base of transistor 714 to ready the turn on delay circuit input for the next spark event.

The energy storage provided by L2 B—B and C—C is illustrated in connection with the circuit 700 layout shown and FIGS. 14–15. This topology was developed to develop the highest LED 722 current given the short energy storage time of typically under 8 ps, at the spark gap current flow at the spark plug until the fiber optic LED 722 is pulsed on. With reference to FIG. 15, the illustrated waveform shows the event of current beginning flow across plug gap small delay to store voltage in capacitor 724, and capacitor 702 of FIG. 7 which then provides high current discharge/short duration into LED 722 to send photon flow to fiber optic phototransistor receiver.

Winding L2-C-C is fully rectified by 738, 740, 742, and 744 and applied across capacitor 724 but is also in series with diode bridge 730, 732, 734, and 736. The winding L2 B—B does not contribute to energy storage during the first 8 µs while the capacitor is allowed to acquire charge, but functions to deliver the rapid rise in LED 722 current by providing the series voltage across diodes 730, 732 and diodes 734, 736 in series with diodes 738, 740, 742, and 744, and storage capacitor 724. The current flow is thus very rapid, about 250 nanoseconds. LED 722 current rise time as seen in FIG. 16 for a peak value of about 155 ma for 3 µs duration.

Figure 14:
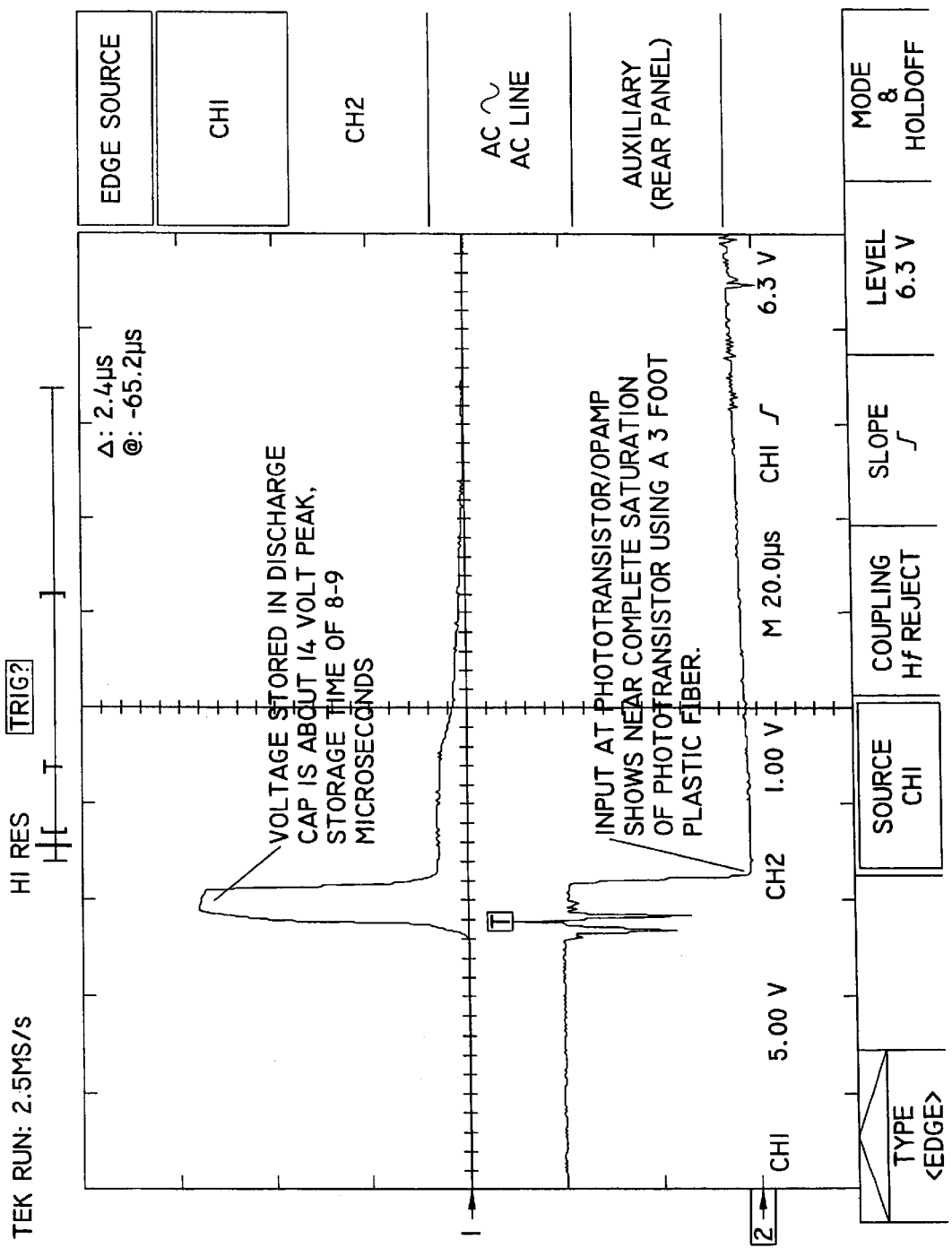
FIG. 14 shows a voltage waveform associated with pickup capacitors, voltage storage, and discharge into the LED timing sensor.

As shown in the schematic diagram of FIG. 14, during the LED 722 discharge operation when transistor 718 turns ON, energy is transferred across 702 from +V1 to +V2, this gives an additional LED 722 current boost of about 50–75% with 702 between +V1 and +V2. Thus, the circuit is optimized for peak LED 722 current flow with minimum delay from the external current flow with spark plug, to provide an output signal of sufficient photon or light output to quickly drive the electronic controller phototransistor into near or full saturation sensed at the op amp/transistor node input. The fiber optic cable transmits the photon energy from the pickup LED 722 to the electronic controller phototransistor with amost no electrical interference because of the large insulation resistance of the plastic fiber interconnection, and low capacitance.

The invention described in the above detailed description is not intended to be limited to the specific form set forth herein, but on the contrary it is intended to cover such alternatives, modifications and equivalents as can reasonably be included within the spirit and scope of the appended claims.

What is claimed is:

1. A spark sensing device for an electronic engine controller of an ignition system, the spark sensing device comprising:

a sensor for detecting a spark generating current;

a high voltage noise filtering circuit associated with the sensor for isolating the spark generating current from electromagnetic interference created by other spark plug wires in the ignition system; and an indicator for receiving a signal from the sensor to provide an indication that the spark generation current has been detected.

2. The spark sensing device of claim 1, wherein the indicator includes a link to the controller to communicate the detection of a spark generating current thereto.

3. The spark sensing device of claim 1, wherein the indicator is a light and the link is a fiber optic cable for transmitting the light generated by the indicator upon detecting the spark generating current to the electronic controller.

4. The system of claim 3 in combination with the electronic controller which includes a light sensor for converting the light transmitted by the cable to the controller to a current signal for further processing.

5. The spark sensing device of claim 3, wherein the sensor is a coil mounted about the spark plug wire, and a sleeve about the sensor coil and mounting the light and cable thereto.

6. A method of sensing sparks in an electronic ignition system comprising:

detecting a spark generating current;

isolating the spark generating current from electromagnetic interference created by spark plug wires in the ignition system; and upon detecting the spark generating current, providing an electromagnetic indication that the current has been detected to a controller.

7. The method of claim 6 wherein the step of providing an electromagnetic indication includes activating a light emitting diode (LED) to transmit an optical signal and transmitting the optical signal over a fiber optic cable to the controller.

8. The method of claim 7 including the light to a current signal at the controller.

* * * * *